(12) United States Patent
Kanie et al.

(10) Patent No.: US 6,993,218 B2
(45) Date of Patent: Jan. 31, 2006

(54) OPTICAL SWITCH AND OPTICAL SWITCH ARRAY

(75) Inventors: Tomohiko Kanie, Yokohama (JP);
Makoto Katayama, Yokohama (JP);
Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 222 days.

(21) Appl. No.: 10/246,761

(22) Filed: Sep. 19, 2002

(65) Prior Publication Data

US 2003/0103715 A1    Jun. 5, 2003

(30) Foreign Application Priority Data

Sep. 21, 2001  (JP) .......................... P2001-289611

(51) Int. Cl.
*G02B 6/35* (2006.01)
(52) U.S. Cl. .......................................... 385/18; 385/22
(58) Field of Classification Search ............ 385/16–24
See application file for complete search history.

(56) References Cited

U.S. PATENT DOCUMENTS

| 5,923,798 | A | 7/1999 | Aksyuk et al. | |
|---|---|---|---|---|
| 5,998,906 | A | 12/1999 | Jerman et al. | |
| 6,108,466 | A | 8/2000 | Aksyuk et al. | |
| 6,195,478 | B1 | 2/2001 | Fouquet | |
| 6,229,640 | B1 | 5/2001 | Zhang | |
| 6,363,183 | B1 * | 3/2002 | Koh ............................ | 385/19 |
| 6,847,753 | B2 * | 1/2005 | Abu-Ageel ................... | 385/18 |

FOREIGN PATENT DOCUMENTS

| EP | 0 510 629 A1 | 10/1992 |
|---|---|---|
| EP | 0 961 150 A2 | 12/1999 |
| JP | 2000-98136 A | 4/2000 |
| JP | 2002-116388 | 4/2002 |
| WO | WO 98/09289 | 3/1998 |
| WO | WO 01/51973 A1 | 7/2001 |
| WO | WO 01/63337 A1 | 8/2001 |

OTHER PUBLICATIONS

Cornel Marxer et al., "Vertical Mirrors Fabricated by Deep Reactive Ion Etching for Fiber-Optic Switching Applications", Journal of Microelectromechanical Systems, vol. 6, No. 3, Sep. 1997, pp. 277-279.
Hogari, Kazuo., et al. "Electrostatically driven micromechanical 2×2 optical switch." Applied Optics, Optical Society of America, vol. 30, No. 10, Apr. 1, 1991, XP000202072, pp. 1253-1257, Applied Optics.

* cited by examiner

*Primary Examiner*—John D. Lee

(74) *Attorney, Agent, or Firm*—McDermott Will & Emery LLP

(57) ABSTRACT

An optical switch according to this invention has a planar waveguide in which an optical path is formed. A trench is formed in the upper surface of this planar waveguide. A cantilevered movable member is mounted on the planar waveguide. A comb is formed in the end portion of this movable member. A mirror which intercepts light propagating on the optical path is fixed to the end of the movable member. An electrode opposing the movable member is formed on the planar waveguide. A comb is formed in that portion of this electrode, which opposes the comb of the movable member. The movable member and electrode are connected via a voltage source. When this voltage source generates electrostatic force between the movable member and electrode, the movable member bends, and the mirror moves along the bottom surface of the trench accordingly.

28 Claims, 20 Drawing Sheets

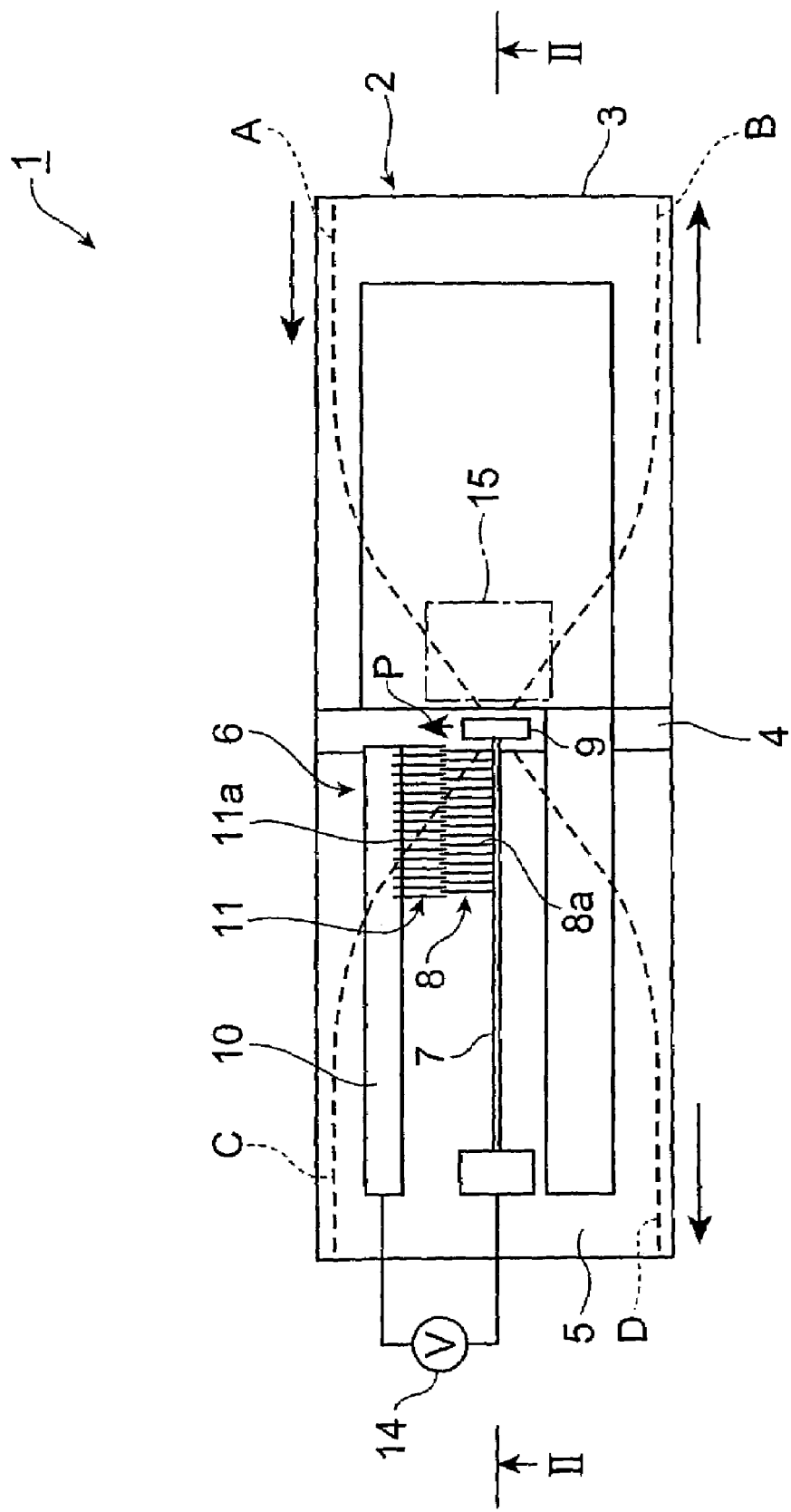

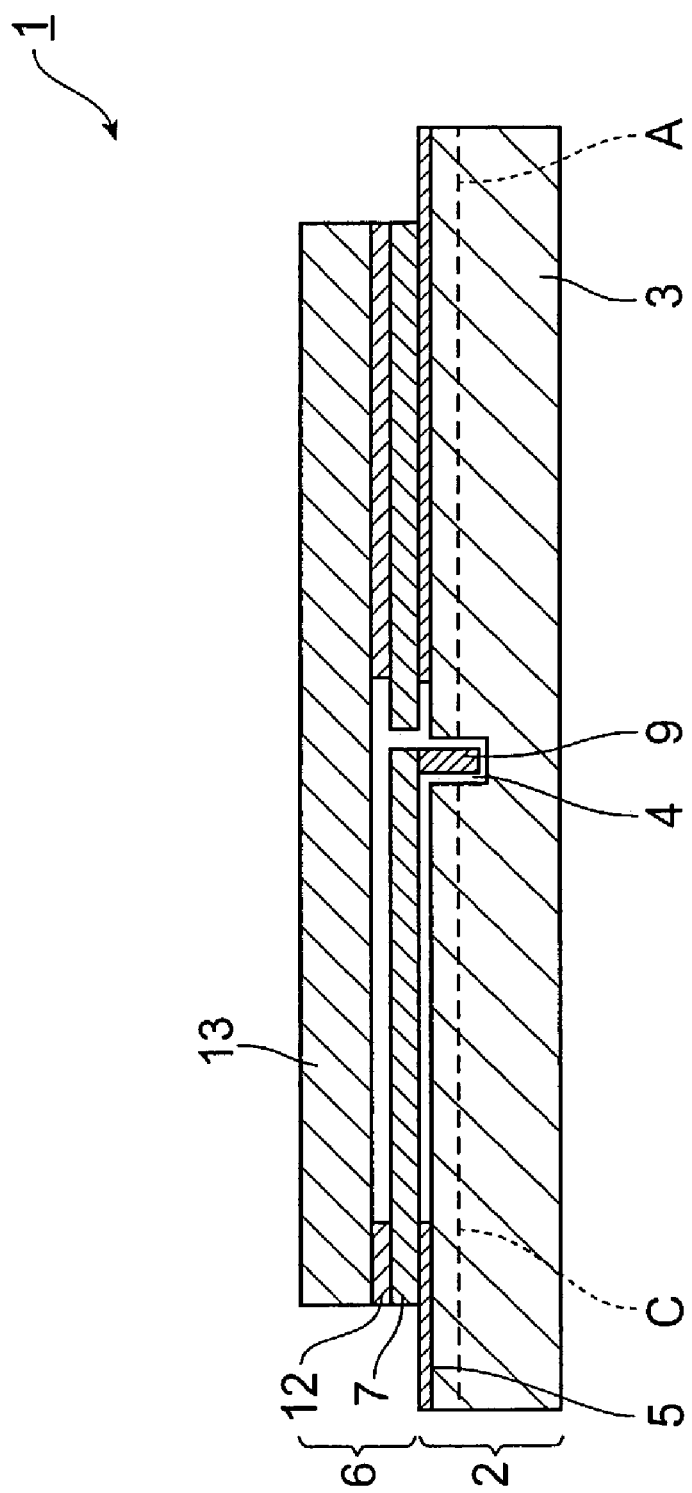

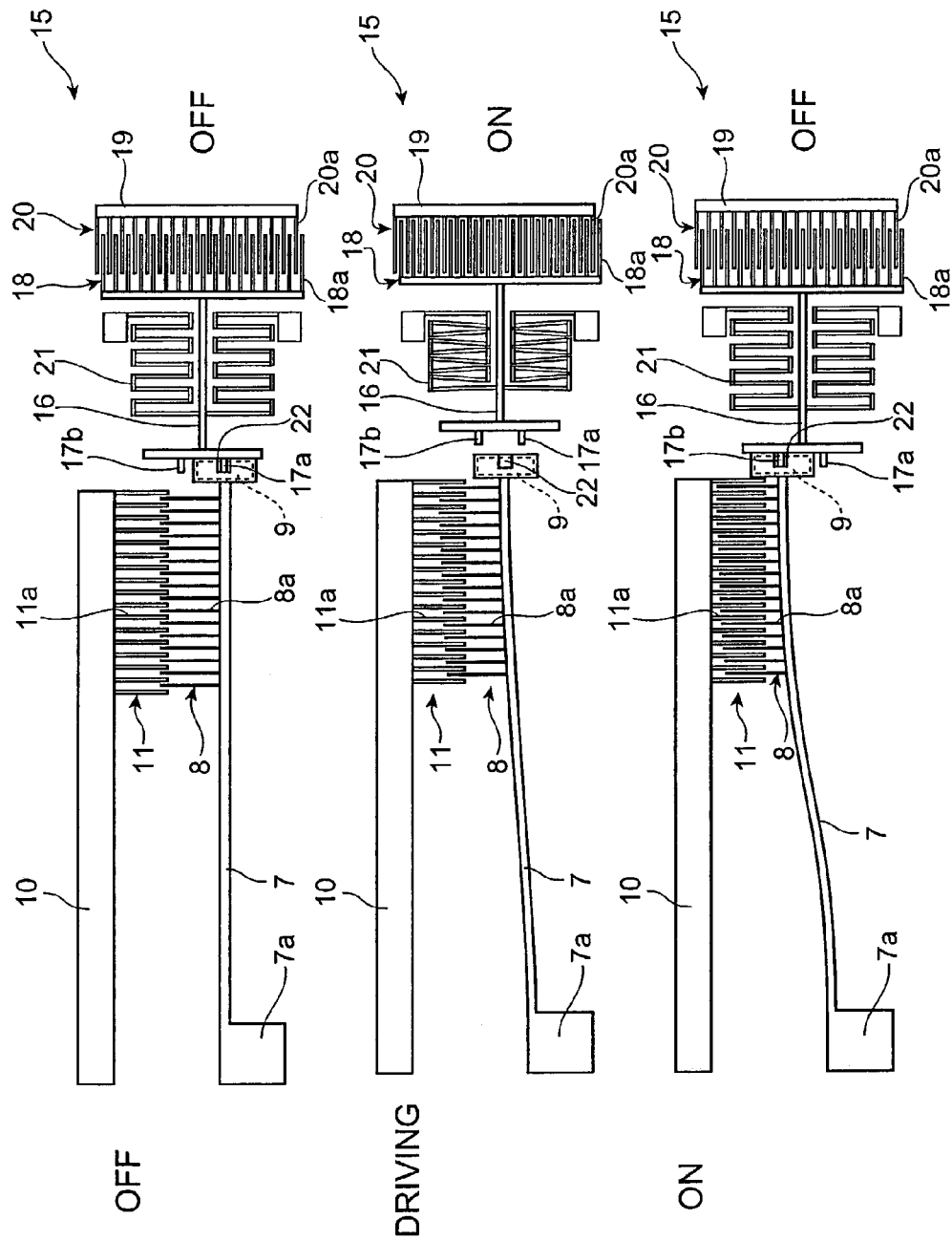

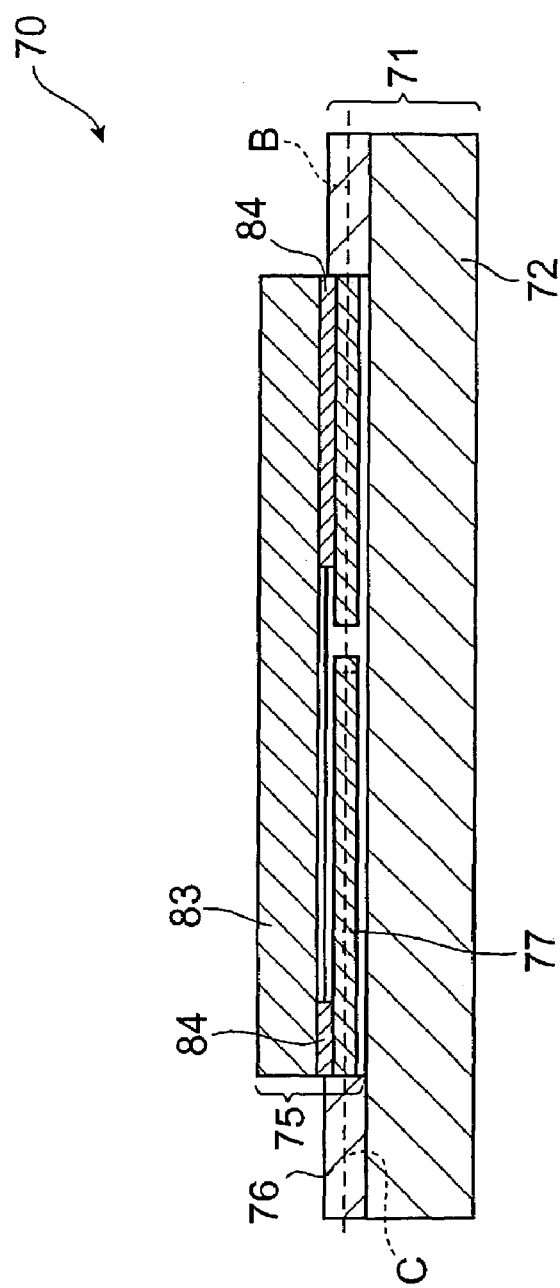

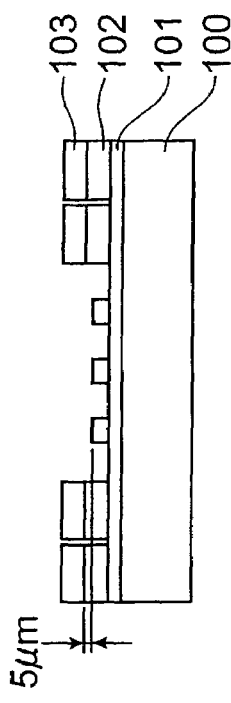
Fig.9A
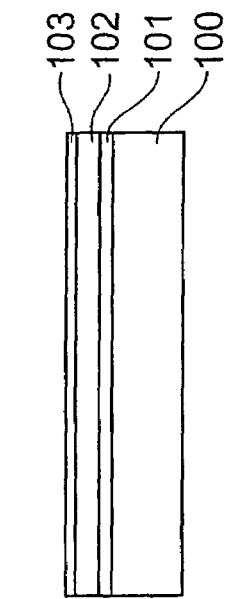
Fig.9B
Fig.9C
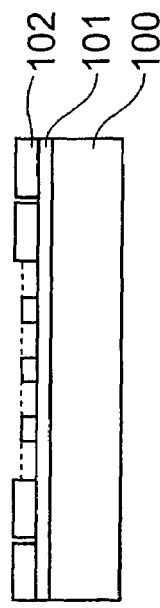
Fig.9D
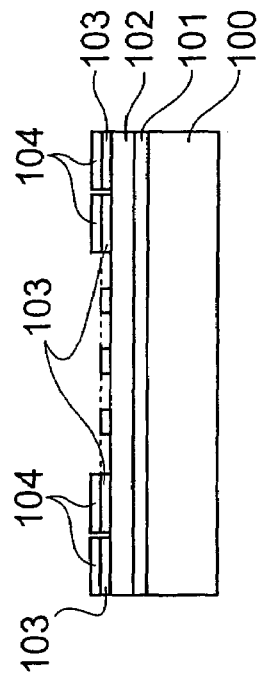
Fig.9E
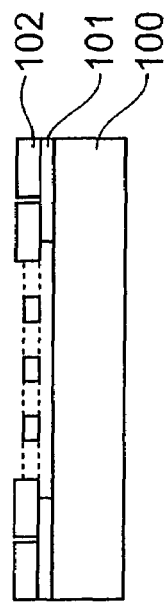
Fig.9F
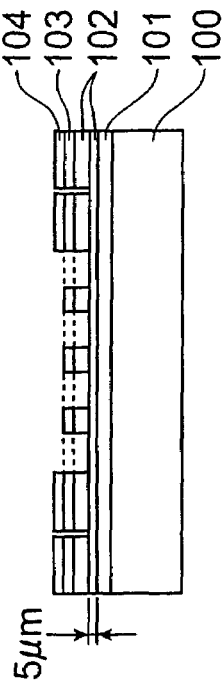

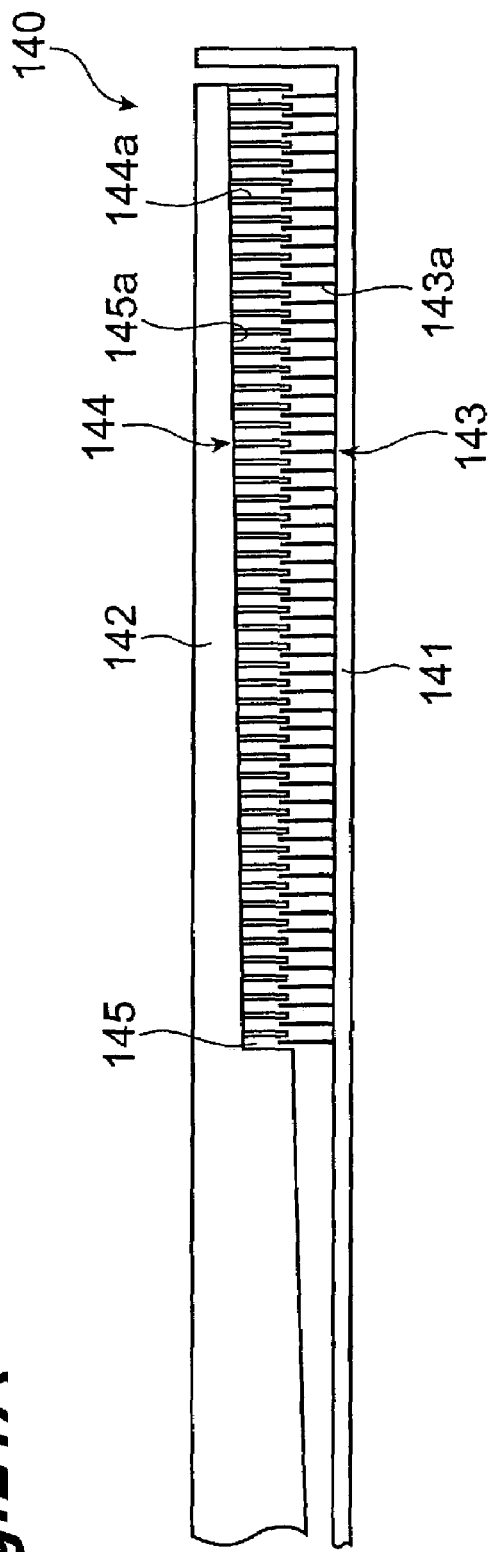
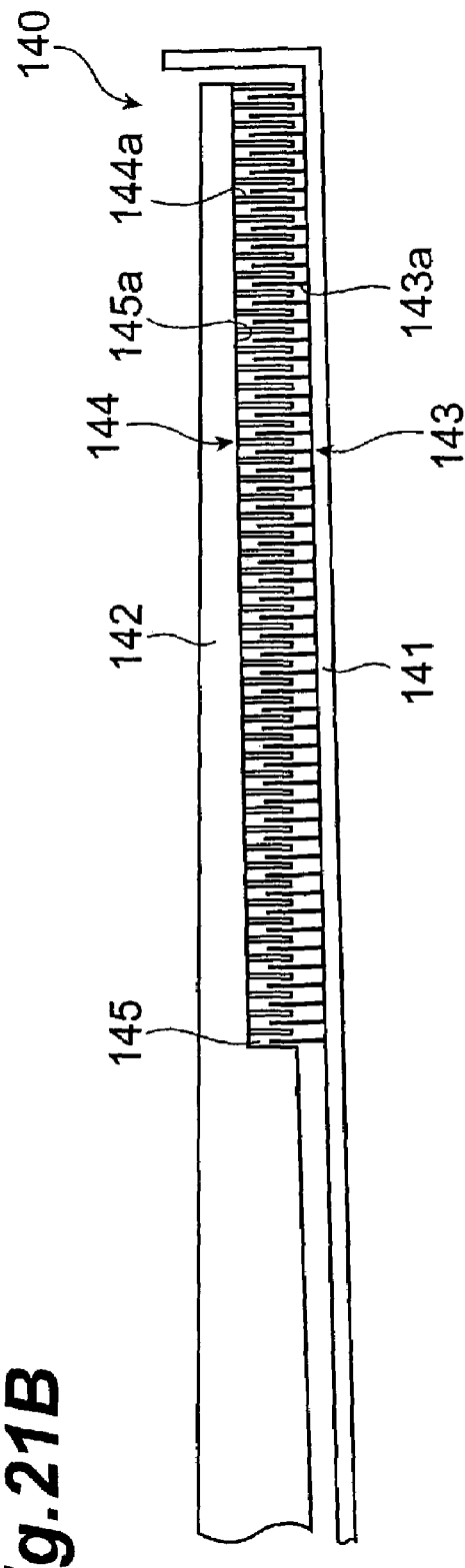

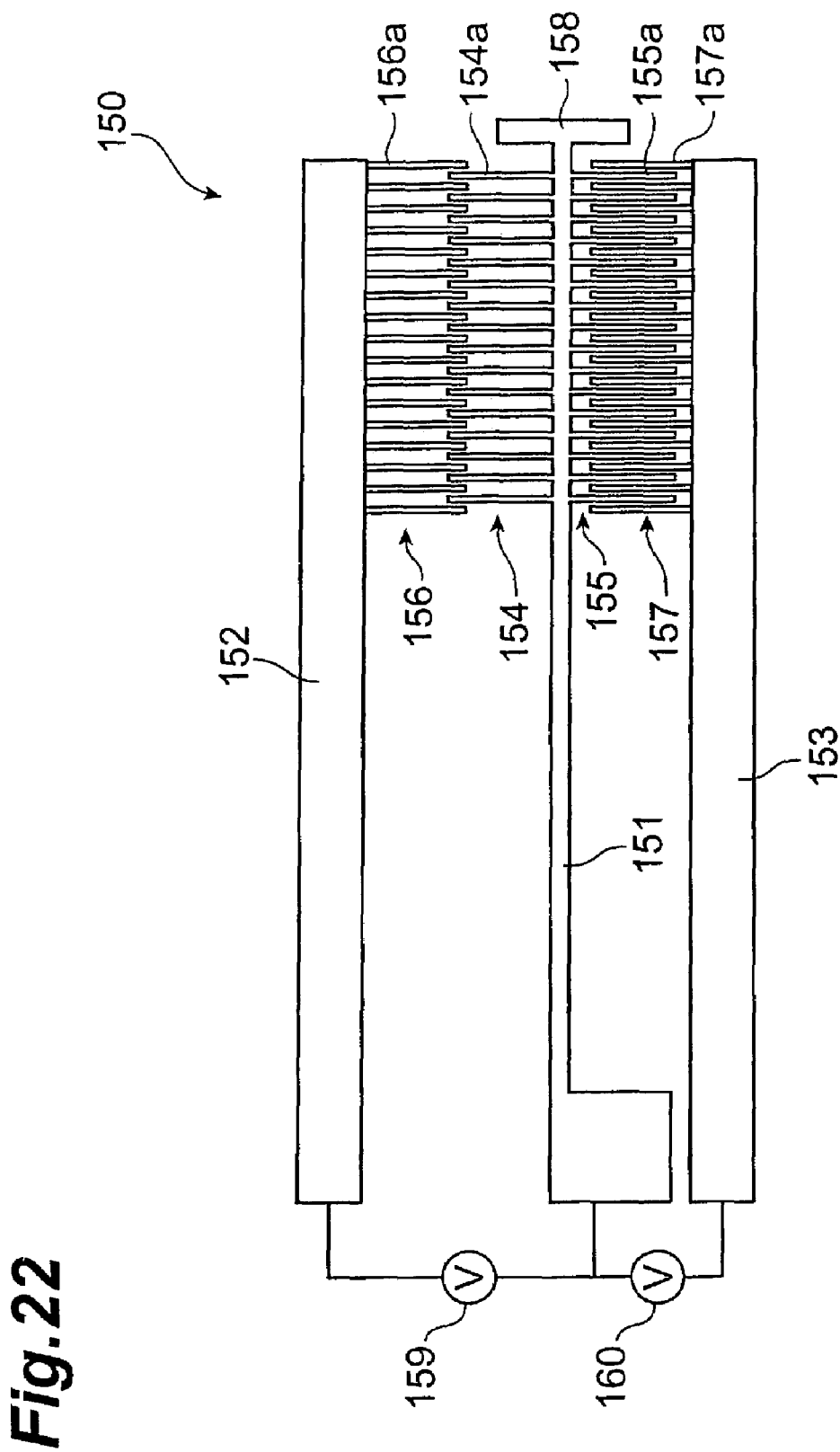

OPTICAL SWITCH AND OPTICAL SWITCH ARRAY

BACKGROUND OF THE INVENTION

1. Field of the Invention

The present invention relates to an optical switch and optical switch array used in optical communication and the like.

2. Related Background Art

A conventionally known optical switch is described in, e.g., "Vertical Mirrors Fabricated by Deep Reactive Ion Etching for Fiber-Optic Switching Applications", J. Microelectromechanical System Vol. 6, 1997, p. 277–p. 285. The optical switch described in this reference switches by inserting and retracting a mirror attached to the end of a support arm into and from an optical path by using an electrostatic actuator.

SUMMARY OF THE INVENTION

In the above prior art, however, switching is performed by inserting and retracting the mirror, linearly in the extending direction of the support art, into and from optical axes perpendicularly crossing each other. This inevitably increases the driving stroke of the electrostatic actuator. Since this increases the area occupied by the actuator, the whole optical switch increases in size. This makes high integration of optical switches difficult.

It is an object of the present invention to provide an optical switch and optical switch array which can be downsized and highly integrated.

An optical switch of the present invention is characterized by comprising a base member, a movable member cantilevered by the base member, a mirror fixed to the end portion of the movable member to intercept light propagating on an optical path formed in the base member, and driving means for driving the movable member such that the mirror moves along the upper surface of the base member in a direction substantially perpendicular to the extending direction of the movable member.

In this optical switch, when the movable member is driven by the driving means while the mirror is in an initial state in which this mirror intercepts light propagating on the optical path, the mirror moves along the upper surface of the base member in the direction substantially perpendicular to the extending direction of the movable member, and reaches a position at which the mirror passes light propagating on the optical path. Since the mirror is thus moved in the direction (substantially the optical switch widthwise direction) substantially perpendicular to the extending direction of the movable member, the width of the optical switch can be decreased. This achieves downsizing and high integration of the optical switch. As a consequence, an optical switch array can be easily formed.

Preferably, the driving means comprises a main electrode opposing the movable member, and means for generating electrostatic force between the main electrode and the movable member. In this structure, the movable member is attracted to the main electrode with the proximal end of the movable member as a center, by the electrostatic force generated between the main electrode and movable member. Accordingly, the mirror moves in the direction substantially perpendicular to the extending direction of the movable member. Thus, the driving means can be implemented with a simple arrangement.

Preferably, the spacing between the main electrode and the movable member decreases from the distal end to the proximal end of the electrode. In this structure, the spacing between the main electrode and movable member decreases as a whole as the movable member approaches the main electrode. This increases the electrostatic force generated between the main electrode and movable member. Therefore, it is possible to lower the driving force (driving voltage) of the movable member and decrease the length of this movable member.

Preferably, the movable member comprises a first comb having a plurality of teeth, and a second comb having a plurality of teeth to be inserted between the teeth of the first comb is formed in that portion of the electrode, which opposes the first comb. Since the surface area of the main electrode increases, the electrostatic force generated between this main electrode and the movable member also increases. Accordingly, it is possible to lower the driving force (driving voltage) of the movable member and decrease the length of this movable member.

Preferably, a comb supporting portion is formed at the end portion of the movable member, and the first comb is formed on the comb supporting portion. In this structure, the electrostatic force generated between the main electrode and movable member concentrates to the end portion of the movable member, and so the displacement amount of the end portion of the movable member also increases. This makes it possible to further decrease the driving force of the movable member and move the mirror efficiently.

Also, the lengths of the teeth of the second comb can be made different from each other such that the spacing between the distal end of each tooth of the first comb and the proximal end of each tooth of the second comb increases from the proximal end to the distal end of the main electrode. In this structure, as the movable member approaches the main electrode, the spacing between the distal end of each tooth of the first comb and the proximal end of each tooth of the second comb decreases as a whole, and this increases the electrostatic force generated between them. Therefore, it is possible to further lower the driving voltage of the movable member and further decrease the length of this movable member.

The driving means favorably further comprises a returning electrode placed on the side of the movable member away from the main electrode, and means for generating electrostatic force between the returning electrode and the movable member. When, with the movable member attracted to the main electrode, the electrostatic force between the main electrode and movable member is turned off and at the same time electrostatic force is generated between the returning electrode and movable member, the movable member is attracted to the returning electrode by this electrostatic force, and the mirror returns to its initial position. This raises the driving speed of the movable member when the mirror is returned, compared to the case in which the mirror is returned to the initial position only by the biasing force of the movable member.

The optical switch favorably further comprises position holding means for holding the mirror in a first position at which the mirror intercepts light propagating on the optical path and a second position at which the mirror passes light propagating on the optical path. When the mirror is in the first or second position, no driving electrical signal need be supplied to the movable member any longer, so the power consumption can be reduced. Also, even when a power failure occurs, the mirror can be held in the first or second position.

The position holding means preferably comprises a position holding movable portion placed in front of the mirror and having a first projection for holding the mirror in the first position and a second projection for holding the mirror in the second position, a position holding driving portion for moving the position holding movable portion in the extending direction of the movable member, and a holding recess which is formed in the end portion of the movable member and into which the first and second projections are inserted. To hold the mirror in the first position, the position holding movable portion is moved toward the movable member to fit the first projection into the holding recess. To hold the mirror in the second position, the position holding movable portion is moved toward the movable member to fit the second projection into the holding recess. To release the mirror, the position holding movable portion is moved away from the movable member. Consequently, the mirror can be reliably held in the first or second position.

The position holding means can be a spring member which is placed in front of the mirror, is in contact with the end portion of the movable member, and has spring force which biases the movable member. In this structure, the mirror is held in the first or second position as the movable member is pushed by the spring member. To release the mirror, driving force larger than the spring force of the spring member is generated in the movable member by the driving means, thereby contracting the spring member. Consequently, the mirror can be reliably held in the first or second position. In addition, the structure of the position holding means is simplified because no actuator is necessary.

Furthermore, the position holding means can comprise a position holding movable portion placed in front of the mirror, a position holding electrode opposing the position holding movable portion, a first holding notch formed in the end portion of the movable member to lock the position holding movable portion such that the mirror is held in the first position, and a second holding notch formed in the end portion of the movable member to lock the position holding movable portion such that the mirror is held in the second position. To hold the mirror in the first position, the position holding movable portion is moved away from the position holding electrode and locked in the first holding notch. To hold the mirror in the second position, the position holding movable portion is moved away from the position holding electrode and locked in the second holding notch. To release the mirror, the position holding movable portion is moved toward the position holding electrode. Accordingly, the mirror can be reliably held in the first or second position.

Preferably, the movable member is designed such that the mirror intercepts light propagating on the optical path in a normal state. When the mirror is in the position at which it intercepts light, the mirror surface is parallel to the widthwise direction of the switch. As a consequence, light is reflected by the mirror without any deterioration of the optical characteristics.

Furthermore, the base member is favorably a planar waveguide comprising a core which forms the optical path, and a cladding formed around the core. In this case, the base member need not have any lenses and the like, so the optical switch can be simplified.

This planar waveguide preferably has a trench which is formed on the optical path to extend in the direction substantially perpendicular to the extending direction of the movable member, and into which the mirror enters. In this case, a 2×2 optical switch, for example, can be simply constructed.

Also, the planar waveguide can comprise a cladding removed portion formed by removing the cladding except for a portion around the core, and a cut portion which is formed on the optical path to connect to the cladding removed portion, and into which the mirror enters, and the movable member can be formed in the cladding removed portion such that the mirror is positioned in the same plane as the core. Since the height of the optical switch can be decreased, a 1×2 optical switch, for example, can be downsized.

The cladding removed portion is preferably formed by removing the cladding by reactive ion etching. In this case, the cladding can be readily removed to leave any arbitrary shape.

Preferably, the movable member and the mirror are simultaneously formed using the same material. This simplifies the formation steps of the movable member and mirror.

The movable member and the mirror are preferably made of silicon, since a mirror having appropriate reflectivity can be easily formed.

Favorably, a mirror device comprising the movable member and the mirror is bonded to the planar waveguide. This facilitates the manufacture of the optical switch.

Preferably, an aligning projection is formed on one of the planar waveguide and the mirror device, and an aligning recess which fits on this aligning projection is formed in the other of the planar waveguide and the mirror device. With this structure, the planar waveguide and mirror device can be accurately and easily aligned when they are bonded.

The planar waveguide and the mirror device are preferably bonded by anodic bonding. Since an adhesive or the like need not be used in the bonding, deformation by temperature can be prevented. Consequently, the planar waveguide and mirror device can be stably bonded.

A substrate of this planar waveguide is favorably made of silicon or glass containing alkali metal ion. This facilitates the anodic bonding.

An optical switch array of the present invention is characterized by comprising a base member, and a plurality of mirror devices arranged in parallel on the base member, wherein the mirror device comprises a movable member cantilevered by the base member, a mirror fixed to the end portion of the movable member to intercept light propagating on an optical path formed in the base member, and driving means for driving the movable member such that the mirror moves along the upper surface of the base member in a direction substantially perpendicular to the extending direction of the movable member.

When the mirror is thus moved in the direction (substantially the mirror device widthwise direction) substantially parallel to the extending direction of the movable member, the width of the mirror device can be decreased. This achieves downsizing and high integration of the optical switch array.

Preferably, the array pitch of the mirror devices is 500 μm or less. Accordingly, a smaller and more highly integrated optical switch array can be obtained.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a schematic view showing the first embodiment of an optical switch according to the present invention, and FIG. 2 is a sectional view taken along a line II—II in FIG. 1;

FIGS. 3A to 3C are views showing a position holding mechanism and mirror position switching operation in the optical switch shown in FIG. 1;

FIG. 7 is a sectional view taken along a line VII—VII in FIG. 6;

FIGS. 16 to 20, 21A, and 21B are views showing movable members and electrodes in other embodiments of the optical switch according to the present invention; and FIG. 22 is a view showing still another embodiment of the optical switch according to the present invention.

DESCRIPTION OF THE PREFERRED EMBODIMENTS

Figure 4D:
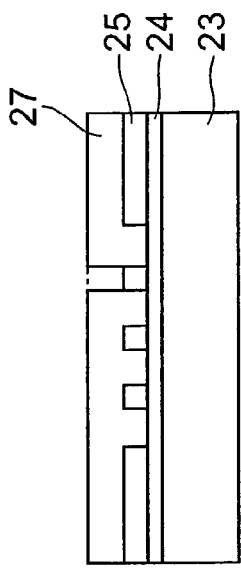
FIGS. 4A to 4F are views showing an example of the process of manufacturing a mirror device in the optical switch shown in FIG. 1.

Preferred embodiments of the present invention will be described in detail below with reference to the accompanying drawings. To facilitate the comprehension of the explanation, the same reference numerals denote the same parts, where possible, throughout the drawings, and a repeated explanation will be omitted.

FIG. 1 is a schematic view showing the first embodiment of an optical switch according to the present invention. FIG. 2 is a sectional view taken along a line II—II in FIG. 1. Referring to FIGS. 1 and 2, an optical switch 1 of this embodiment is a 2×2 switch. This optical switch 1 has a planar waveguide 2 having a substrate 3 which includes a core forming optical paths A to D and a cladding formed around the core. In the upper surface of a central portion of this substrate 3, a trench 4 extending in the widthwise direction of the optical switch 1 is formed. The optical paths A to D cross each other in this trench 4. At the input and output ends of these optical paths A to D, the distance between the optical paths A and B and between the optical paths C and D is, e.g., 250 μm. Also, the width of the trench 4 is, e.g., 50 μm. An insulating layer 5 is formed on the substrate 3.

A mirror device 6 is mounted on this planar waveguide 2. This mirror device 6 has a cantilevered movable member 7 fixed on the insulating layer 5. This movable member 7 extends to the trench 4 in a direction perpendicular to the widthwise direction of the optical switch 1. The movable member 7 is made of, e.g., silicon, and has a thickness of 50 μm. Note that the silicon as the material of this movable member 7 is made conductive by doping an impurity such as boron. A comb 8 having a plurality of teeth 8a is formed at the end portion of the movable member 7. Also, a mirror 9 for intercepting light propagating on the optical paths A and C is fixed to the end of the movable member 7. This mirror 9 can enter the trench 4. The thickness, height, and width of the mirror 9 are, e.g., 30, 50, and 50 μm, respectively.

A long and narrow electrode 10 opposing the movable member 7 is formed on the insulating layer 5. This electrodes 10 extends to the trench 4 parallel to the movable member 7. The electrode 10 is also made of conductive silicon similar to that of the movable member 7, and has a thickness of 50 μm. A comb 11 having a plurality of teeth 11a is formed in that portion of the electrode 10, which faces the comb 8. These teeth 11a and the teeth 8a of the comb 8 are staggered.

On the movable member 7 and electrode 10 as described above, an insulating layer 12 made of silicon oxide ($SiO_2$) or the like is formed. The thickness of this insulating layer 12 is, e.g., 2 μm. A silicon substrate 13 is formed on the insulating layer 12.

The movable member 7 and electrode 10 are connected via a voltage source 14. When this voltage source 14 applies a predetermined voltage between the movable member 7 and electrode 10, electrostatic force is generated between these movable member 7 and electrode 10. By this electrostatic force, as shown in FIGS. 3A to 3C, the movable member 7 bends from its proximal end portion 7a. Accordingly, the mirror 9 moves, e.g., 50 μm along the bottom surface of the trench 4 in an arrow P direction substantially perpendicular to the extending direction of the movable member 7.

In this optical switch 1 as described above, the movable member 7 extends straight in a normal state (OFF state) (FIG. 3A). In this state, light propagating on the optical path A is reflected to the optical path B by the mirror 9. Since light on the optical path B is reflected by the mirror 9 when the movable member 7 is in the normal state as described above, the mirror surface of the mirror 9 is parallel to the widthwise direction of the optical switch 1. Consequently, light can be reflected without any deterioration of the optical characteristics.

When the voltage source 14 applies a predetermined voltage between the movable member 7 and electrode 10, the end portion of the movable member 7 is attracted to the electrode 10 by the electrostatic force generated between these movable member 7 and electrode 10, so the mirror 9 moves toward the electrode 10 (FIGS. 3B and 3C). In this state (ON state), light propagating on the optical path A is guided to the optical path D through the trench 4.

Since the comb 11 is formed on the electrode 10, the surface area of the whole electrode 10 increases. This increases the electrostatic force generated between the movable member 7 and electrode 10. Accordingly, it is possible to lower the voltage applied between the movable member 7 and electrode 10 and decrease the length of the movable member 7.

The above optical switch 1 has a position holding mechanism 15 placed in front of the mirror 9. This position holding mechanism 15 automatically holds the mirror 9 without any electric power in an intercepting position (first position) in which the mirror 9 reflects light propagating on the optical paths A and C, and in a through position (second position) in which the mirror 9 passes light propagating on the optical paths A and C.

As shown in FIGS. 3A to 3C, the position holding mechanism 15 has an H-shaped position holding movable portion 16. The distal end portion (the end portion which faces the mirror 9) of this position holding movable portion 16 has a projection 17a for holding the mirror 9 in the intercepting position and a projection 17b for holding the mirror 9 in the through position. The proximal end portion of the position holding movable portion 16 has a comb 18 having a plurality of teeth 18a. An electrode 19 opposes this comb 18. This electrode 19 has a comb 20 having a plurality of teeth 20a. Also, the position holding movable portion 16 is coupled to an elastic member 21 such as a leaf spring having spring force which biases this position holding movable portion 16 toward the movable member 7. Although not shown, the electrode 19 and elastic member 21 are connected via a voltage source. When this voltage source applies a predetermined voltage across the electrode 19 and elastic member 21, electrostatic force is generated between the position holding movable portion 16 and electrode 19 to attract the position holding movable member 16 to the electrode 19. A holding recess 22 into which the projections 17a and 17b are inserted is formed in the end portion of the movable member 7.

When the mirror 9 is in the intercepting position, the projection 17a is inserted into the holding recess 22, so the mirror 9 is automatically held in this intercepting position (FIG. 3A). To perform light switching (switch optical paths) from this state, the voltage source (not shown) applies a predetermined voltage across the electrode 19 and elastic member 21. Consequently, the elastic member 21 is contracted by the electrostatic force generated between the position holding movable portion 16 and electrode 19. So, the position holding movable member 16 moves toward the electrode 19 to release the mirror 9 (FIG. 3B).

While this state is maintained, the voltage source 14 applies a predetermined voltage between the movable member 7 and electrode 10, thereby moving the mirror 9 to the through position. After that, the voltage application to the electrode 19 and elastic member 21 is stopped. Accordingly, the biasing force of the elastic member 21 moves the position holding movable portion 16 toward the movable member 7, and the projection 17b enters the holding recess 22. As a consequence, the mirror 9 is automatically held in the through position (FIG. 3C).

As described above, the mirror 9 is automatically held in the intercepting position and through position by the position holding mechanism 15. This eliminates the need to keep supplying the voltage to the movable member 7 and electrode 10. Accordingly, the power consumption of the optical switch 1 can be reduced. In addition, the mirror 9 can be held in the intercepting position and through position even when a power failure occurs.

FIGS. 4A to 4F illustrate an example of the process of manufacturing the mirror device 6. Note that the manufacture of the position holding mechanism 15 will be omitted.

Figure 4E:
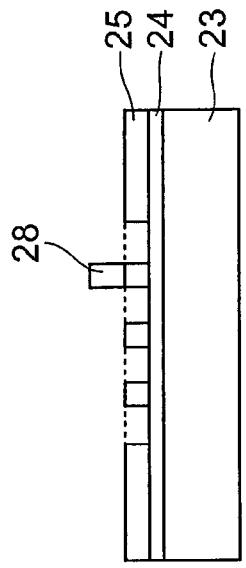
Figure 4F:
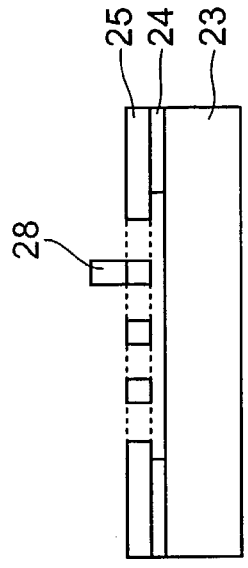
Figure 4A:
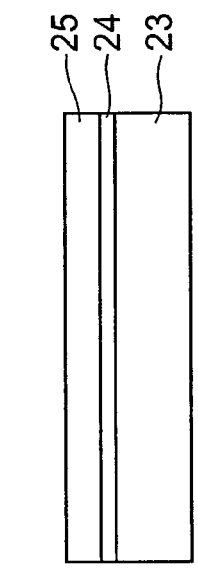
Figure 4B:
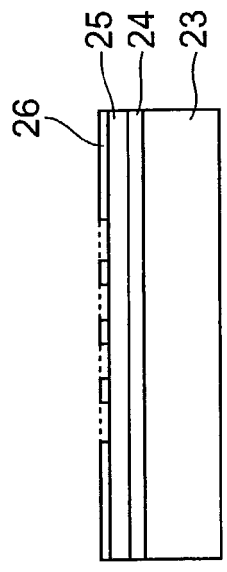
Figure 4C:
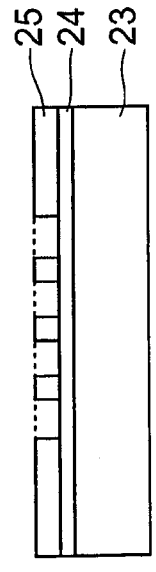

First, an SOI (Silicon On Insulator) wafer is prepared. This wafer is obtained by forming a 3-μm thick $SiO_2$ layer 24 on a 500-μm thick silicon (Si) substrate 23, and forming a 50-μm thick Si layer 25 on this $SiO_2$ layer 24 (FIG. 4A). Subsequently, a 2-μm thick resist pattern 26 for forming the movable member 7, electrode 10, and the like is formed on the Si layer 25 by photolithography (FIG. 4B). This resist pattern 26 is used as a mask to etch the Si layer 25 by reactive ion etching (FIG. 4C). Photolithography is then performed using a 50-μm thick photoresist 27 to form a pattern for forming the mirror 9 (FIG. 4D). A mirror portion 28 is formed by nickel plating or the like, and the resist 27 is removed (FIG. 4E). Subsequently, the $SiO_2$ layer (sacrificial layer) 24 is removed by wet etching using hydrofluoric acid. As a consequence, the $SiO_2$ layer 24 below portions having small pattern widths is completely removed to form a cantilever (FIG. 4F).

The mirror device 6 thus manufactured is turned over and fixed on the planar waveguide 2 by an adhesive or the like, thereby obtaining the optical switch 1 described above.

In the optical switch 1 of this embodiment having the above arrangement, the mirror 9 is fixed to the end portion of the movable member 7. This movable member 7 is so driven that the mirror 9 moves along the bottom surface of the trench 4 in the direction (substantially the optical switch widthwise direction) substantially perpendicular to the extending direction of the movable member 7. This reduces the displacement amount of the mirror 9. Also, the movable member 7 is cantilevered. This reduces the driving force for displacing the mirror 9 by a predetermined amount, compared to a structure fixed at the two ends. In addition, since the movable member 7 and electrode 10 are integrated, the size of this electrode 10 can be decreased. This elongates the electrode 10 along the movable member 7, so the width of the optical switch 1 can be decreased. Accordingly, the optical switch can be downsized and highly integrated, and this easily achieves an optical switch array.

Figure 5:
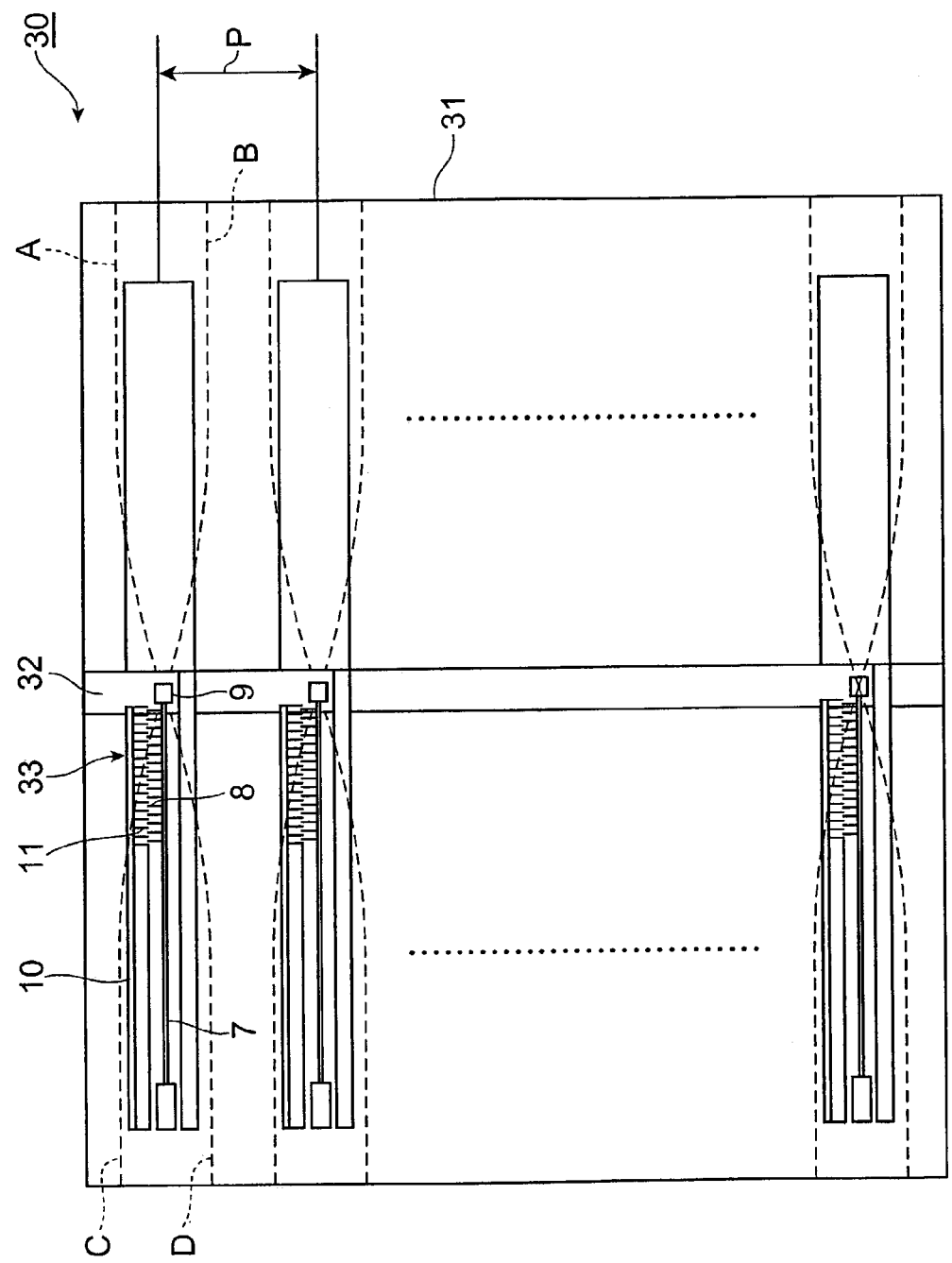
FIG. 5 is a schematic view showing an optical switch array using the optical switch shown in FIG. 1.

FIG. 5 shows an example of an optical switch array using the optical switch 1 described above. Referring to FIG. 5, this optical switch array 30 has a planar waveguide 31 in which optical paths A to D of a plurality of channels of are formed. In the upper surface of a central portion of this planar waveguide 31, a trench 32 extending in the widthwise direction of the optical switch array 30 is formed. In this trench 32, the optical paths A to D of each channel cross each other.

On the planar waveguide 31 as described above, mirror devices 33 equal in number to the channels are arranged parallel to each other. Each mirror device 33 has a structure equivalent to that of the mirror device 6 of the optical switch 1 described above. An array pitch P (equivalent to the width of one channel in the optical switch array 30) of these mirror devices 33 is preferably 500 μm or less. As described above, the optical switch array 30 can be downsized and highly integrated by the use of the optical switch 1.

Figure 6:
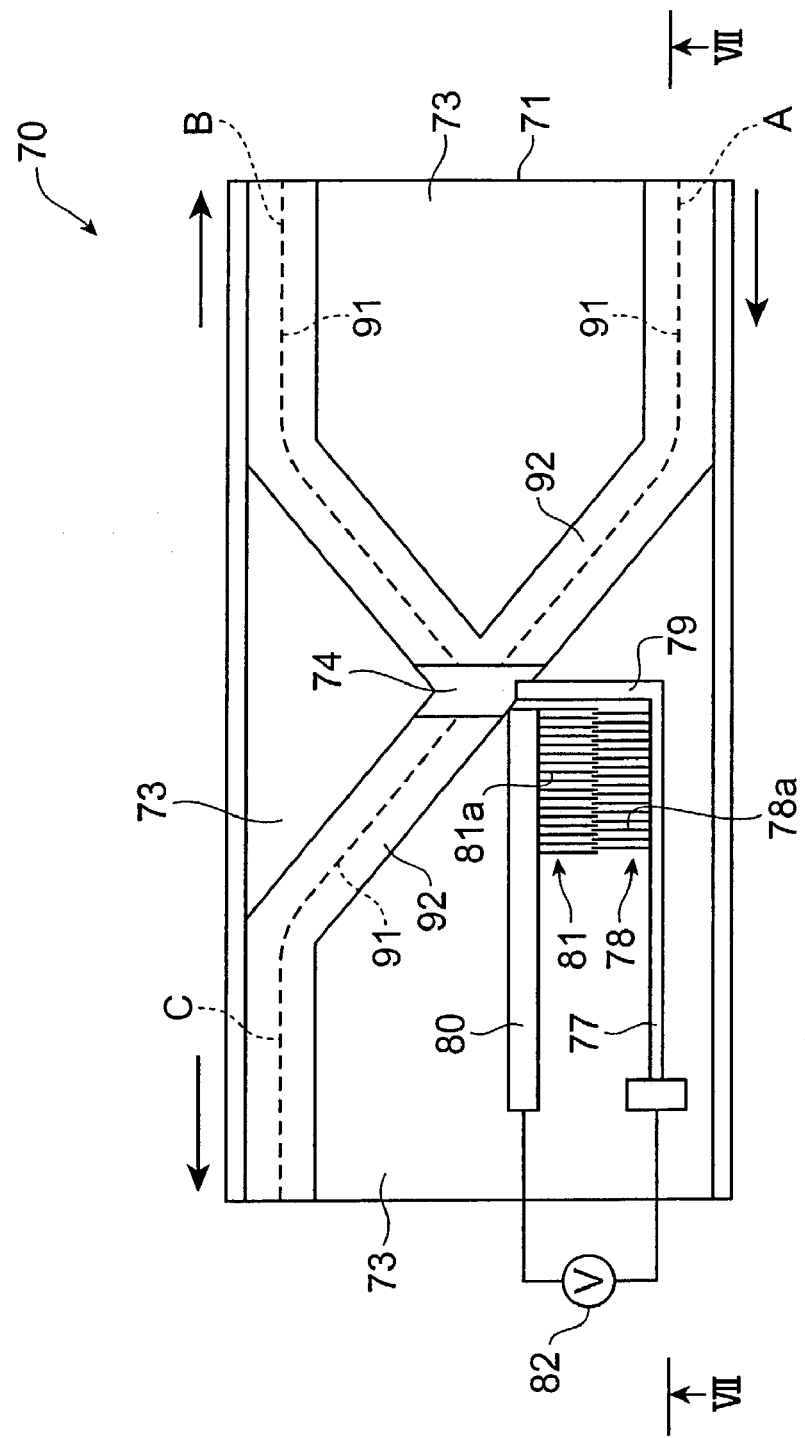
FIG. 6 is a schematic view showing the second embodiment of the optical switch according to the present invention.
Figure 8A:
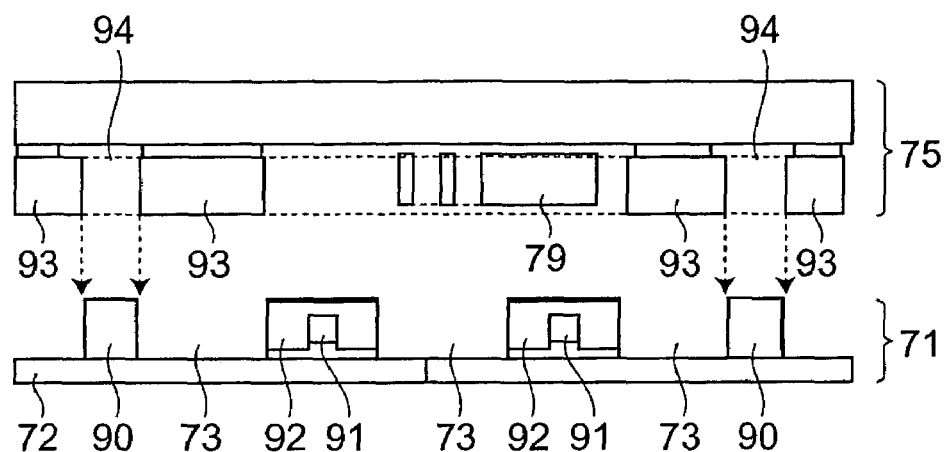
FIGS. 8A and 8B are schematic views showing a mirror device and planar waveguide in the optical switch shown in FIG. 6, and FIGS. 9A to 9F are views showing an example of the process of manufacturing this mirror device.
Figure 8B:
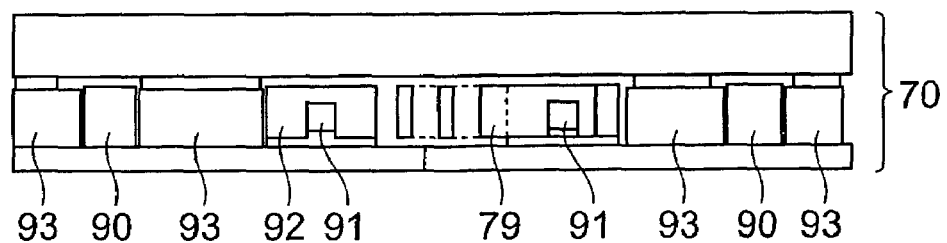

FIG. 6 is a schematic view showing the second embodiment of the optical switch according to the present invention. FIG. 7 is a sectional view taken along a line VII—VII in FIG. 6. Referring to FIGS. 6 and 7, an optical switch 70 of this embodiment is a 1×2 switch. This optical switch 70 has a planar waveguide 71 having a substrate 72 made of silicon or glass such as silica glass or soda glass containing alkali metal ion. An optical waveguide 76 is formed on this substrate 72. This optical waveguide includes a core 91 forming optical paths A to C and a cladding 92 formed around the core 91 (FIGS. 8A and 8B). The substrate 72 also has cladding removed portions 73 formed by removing the cladding 92 except for portions around the core 91. In the upper surface of a central portion of this substrate 72, a cut portion 74 connecting to the cladding removed portions 73 is formed. The optical paths A to C cross each other in this cut portion 74. The distance between the optical paths A and B is, e.g., 250 $\mu$m. The width of the cut portion is, e.g., 50 $\mu$m. As shown in FIGS. 8A and 8B, aligning projections 90 are formed on the substrate 72.

A mirror device 75 is mounted on the upper surface of this base substrate 72. This mirror device 75 has a silicon substrate 83 on which (on the lower surface of which) a movable member 77 and electrode 80 are formed via a 2-$\mu$m thick insulating layer 84 made of silicon dioxide ($SiO_2$). These movable member 77 and electrode 80 are made of silicon or the like and have a thickness of 50 $\mu$m. Note that the silicon as the material of the movable member 77 and electrode 80 is made conductive by doping an impurity such as boron.

The insulating layer 84 above the movable member 77 is removed, so this removable member 77 is cantilevered. The movable member 77 extends to the cut portion 74 in a direction perpendicular to the widthwise direction of the optical switch 70. A comb 78 having a plurality of teeth 78a is formed at the end portion of the movable member 77. Also, a mirror 79 for intercepting light propagating on the optical path B is integrated with the end of the movable member 77. The mirror 79 is made of the same silicon as the movable member 77 and hence has a certain high reflectivity. The thickness, height, and width of the mirror 79 are, e.g., 10, 50, and 100 $\mu$m, respectively.

The electrode 80 extends to the cut portion 74 parallel to the movable member 77. A comb 81 having a plurality of teeth 81a is formed in that portion of the electrode 80, which faces the comb 78. These teeth 81a and the teeth 78a of the comb 78 are staggered. The movable member 77 and electrode 80 are connected via a voltage source 82. When this voltage source 82 applies a predetermined voltage across the movable member 77 and electrode 80, electrostatic force is generated between these movable member 77 and electrode 80, and switching is performed.

As shown in FIGS. 8A and 8B, the mirror device 75 has projections 93 which form aligning recesses 94 in which the aligning projections 90 of the planar waveguide 71 are fitted. With these aligning projections 90 fitted in the aligning recesses 94, the mirror device 75 is bonded to the planar waveguide 71. In this state, the movable member 77 and electrode 80 of the mirror device 75 are arranged in the cladding removed portion 73 of the planar waveguide 71, so that the mirror 79 is positioned in the same plane as the core 91. This decreases the height of the optical switch 70.

In this optical switch 70 as described above, the movable member 77 extends straight in a normal state (OFF state) (FIG. 6). In this state, light propagating on the optical path A is guided to the optical path C through the cut portion 74. On the other hand, when the voltage source 82 applies a predetermined voltage across the movable member 77 and electrode 80, the end portion of the movable member 77 is attracted to the electrode 80 by the electrostatic force generated between these movable member 77 and electrode 80, so the mirror 79 enters the cut portion 74. In this state (ON state), light propagating on the optical path A is reflected to the optical path B by the mirror 79.

FIGS. 9A to 9F illustrate an example of the process of manufacturing the mirror device 75. First, an SOI wafer is prepared. This wafer is obtained by forming a 2-$\mu$m thick $SiO_2$ layer 101 on a 500-$\mu$m thick Si substrate 100, forming a 50-$\mu$m thick Si layer 102 on this $SiO_2$ layer 101, and forming an $SiO_2$ layer 103 on top of the Si layer 102 (FIG. 9A). Subsequently, a resist pattern 104 for forming the movable member 77, electrode 80, and the like is formed on the $SiO_2$ layer 103 by photolithography (FIG. 9B). This resist pattern 104 is used as a mask to etch the Si layer 102 by reactive ion etching so as to leave only a 5-$\mu$m thick layer on the $SiO_2$ layer 101 (FIG. 9C). The resist pattern 104 is removed, and the $SiO_2$ layer 103 is used as a mask to etch the Si layer 102 down to the $SiO_2$ layer 101 (FIG. 9D). The $SiO_2$ layer 103 is then removed, and portions serving as the movable member, mirror, and electrode are coated with, e.g., Au or Cr (FIG. 9E). Subsequently, the $SiO_2$ layer (sacrificial layer) 101 is removed by wet etching using hydrofluoric acid. As a consequence, the $SiO_2$ layer 101 below portions having small pattern widths is completely removed to form a cantilever (FIG. 9F).

In the above structure, a difference of 5 $\mu$m is produced between the thickness of the portions serving as the movable member, mirror, and electrode and the thickness of the Si layer 102. Therefore, when the mirror device 75 and planar waveguide 71 are bonded, the movable member 77 and electrode 80 are not in contact with the planar waveguide 71. Also, since the movable member 77, mirror 79, and electrode 80 are simultaneously formed by the same material, the manufacturing process of the mirror device 75 is simplified.

Figure 10A:
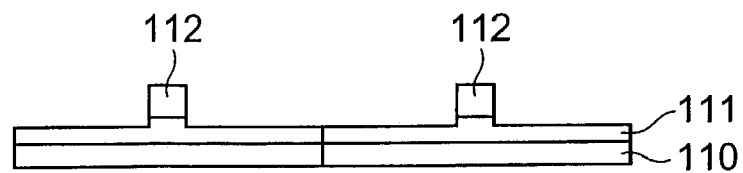
FIGS. 10A to 10D are views showing an example of the process of manufacturing the planar waveguide in the optical switch shown in FIG. 6.
Figure 10B:
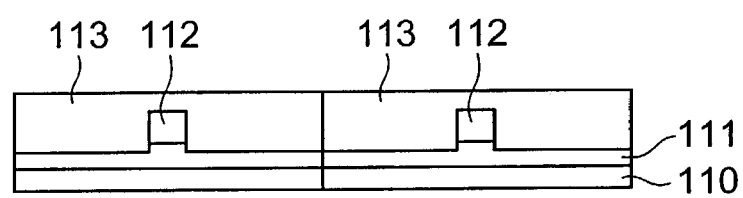
Figure 10C:
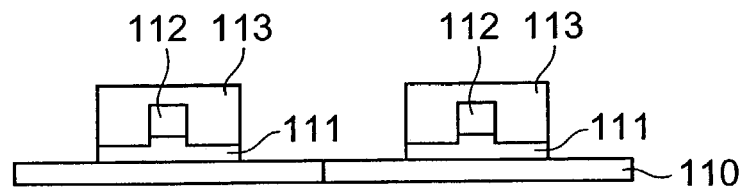
Figure 10D:
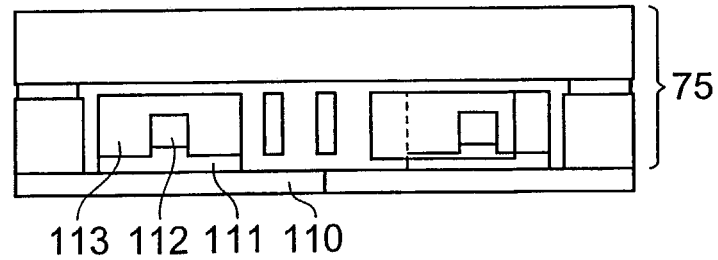

FIGS. 10A to 10D are views showing an example of the process of manufacturing the planar waveguide 71 of this embodiment. First, a substrate 110 made of, e.g., silicon, silica glass, or soda glass is prepared. A silica glass film 111 is formed on the substrate 110, and cores 112 are formed on this silica glass film 111 by photolithography and reactive ion etching (FIG. 10A). Subsequently, claddings 113 made of silica glass are formed on these silica glass film 111 and cores 112 (FIG. 10B). These claddings 113 are then removed by reactive ion etching except for portions around the cores 112 (FIG. 10C). Since the claddings 113 are thus removed by using reactive ion etching, the cladding removed portions 73 can be easily formed except for the portions around the cores 112.

The mirror device 75 described above is turned over and fixed on the thus manufactured planar waveguide 71 by anodic bonding, thereby obtaining the optical switch 70 described above (FIG. 10D). In this optical switch 70, the aligning projections 90 are formed on the planar waveguide 71, and the aligning recesses 94 are formed in the mirror device 75. Therefore, the planar waveguide 71 and mirror device 75 can be accurately and easily aligned when they are bonded. Furthermore, since the planar waveguide 71 and mirror device 75 are bonded by anodic bonding, an adhesive or the like need not be used in the bonding. This produces almost no deformation by temperature, so the planar waveguide 71 and mirror device 75 can be stably bonded.

The optical switch 70 of this embodiment constructed as above can be downsized and highly integrated, and this easily achieves an optical switch array.

Figure 11:
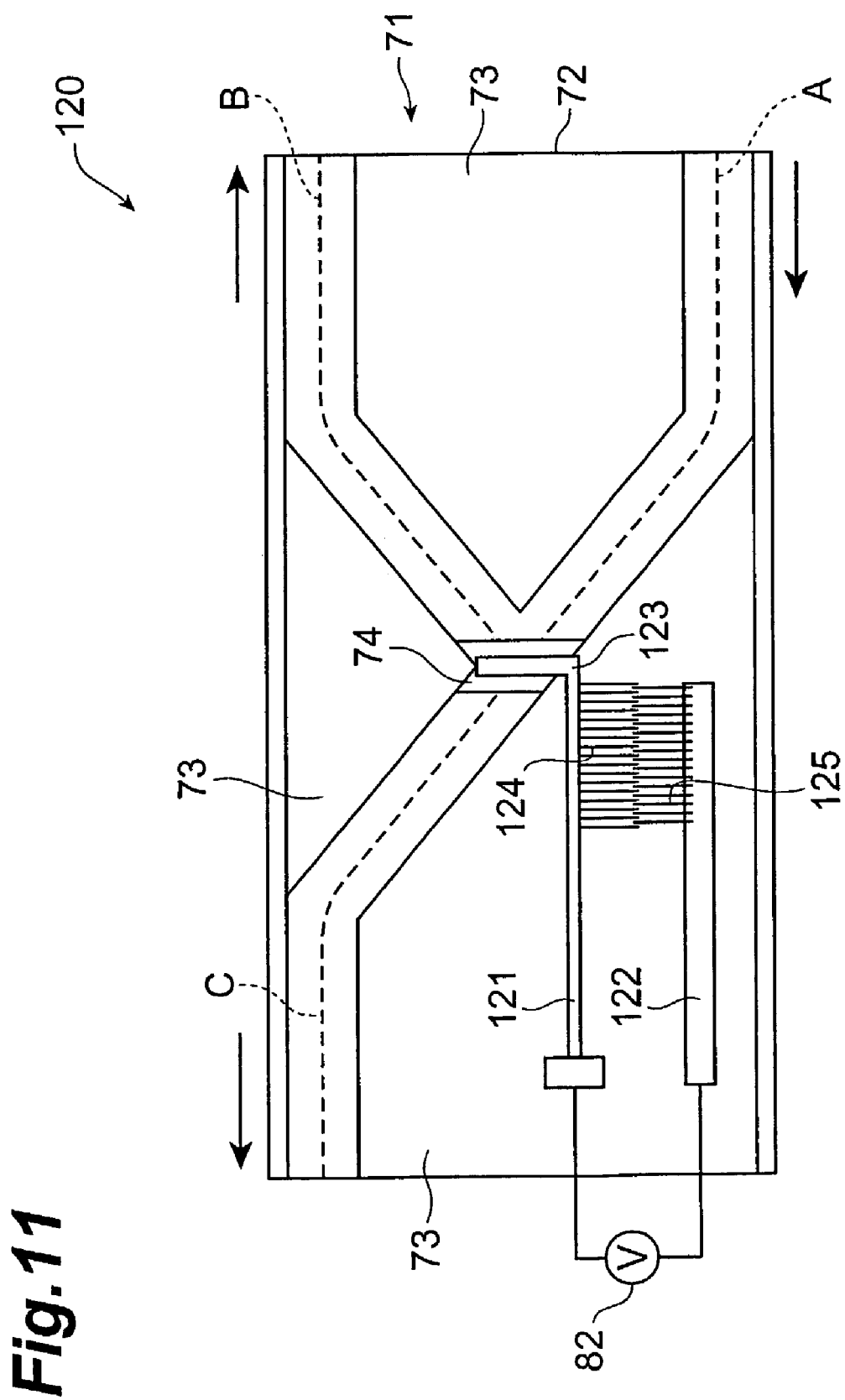
FIG. 11 is a schematic view showing a modification of the optical switch shown in FIG. 6.

FIG. 11 is a schematic view showing a modification of the optical switch of the second embodiment. An optical switch 120 of this modification has a movable member 121, and an electrode 122 opposing this movable member 121. A comb 124 is formed on the end portion of the movable member 121. A comb 125 is formed on that portion of the electrode 122, which opposes the comb 124. A mirror 123 for intercepting light propagating on an optical path A is integrated with the end of the movable member 121. In a normal state, this mirror 123 enters a cut portion 74 to intercept light propagating on the optical path A. When the mirror 123 is in this intercepting position, therefore, the mirror surface of this mirror 123 is parallel to the widthwise direction of the optical switch 120. Accordingly, light can be reflected by the mirror 123 without any deterioration of the optical characteristics.

The third embodiment of the optical switch according to the present invention will be described below with reference to FIGS. 12A and 12B. The optical switch of this embodiment differs from each embodiment described above in the structure of a position holding mechanism.

Figure 12:
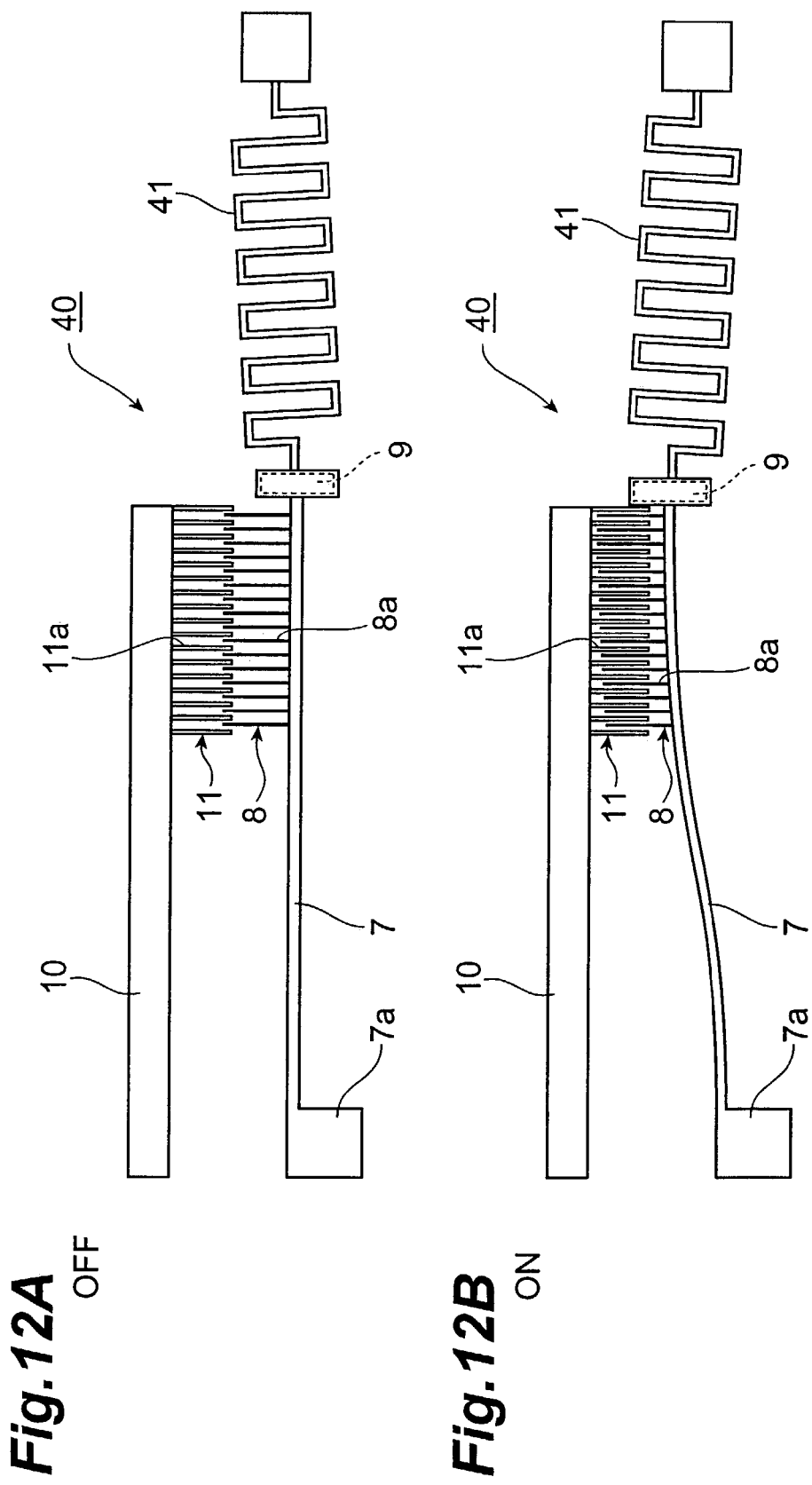
FIGS. 12A and 12B are views showing a position holding mechanism and mirror position switching operation in the third embodiment of the optical switch according to the present invention.

Referring to FIGS. 12A and 12B, an optical switch 40 of this embodiment has a spring member 41 as a position holding mechanism placed in front of a mirror 9. The distal end of this spring member 41 is in contact with the end portion of a movable member 7. The proximal end of the spring member 41 is fixed to, e.g., a substrate 3 (FIG. 1). This spring member 41 has spring force which biases the movable member 7. When the mirror 9 is in an intercepting position (FIG. 12A) or in a through position (FIG. 12B), this position of the mirror 9 is held by the spring force of the spring member 41. On the other hand, when these positions of the mirror 9 are switched, driving force larger than the spring force of the spring member 41 is generated in the movable member 7 by a voltage source (not shown). Consequently, the spring member 41 contracts to release the mirror 9. When the position holding mechanism is constructed by the spring member 41 as described above, no actuator for automatic holding is necessary.

Figure 13:
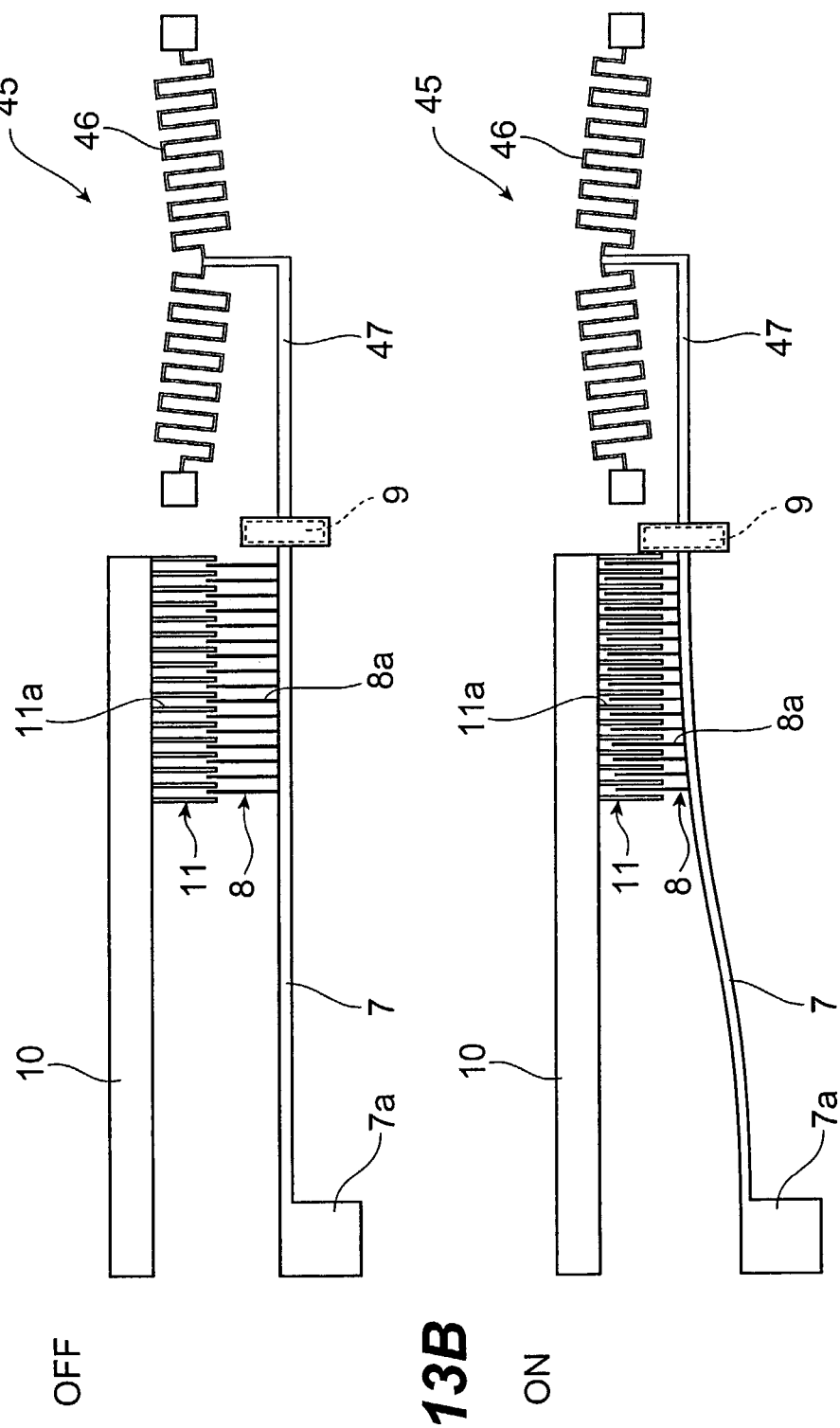
FIGS. 13A and 13B are views showing a position holding mechanism and mirror position switching operation in a modification of the optical switch shown in FIGS. 12A and 12B.

FIGS. 13A and 13B show a modification of the optical switch of this embodiment. Referring to FIGS. 13A and 13B, an optical switch 45 has a spring member 46 whose two end portions are fixed to, e.g., a substrate 3 (FIG. 1), instead of the spring member 41 described above. This spring member 46 is coupled with an L-shaped connecting member 47, and the end portion of this connecting member 47 is in contact with the end portion of a movable member 7. As in the above structure, when a mirror 9 is in an intercepting position (FIG. 13A) or in a through position (FIG. 13B), this position of the mirror 9 is held by the spring force of the spring member 46.

The fourth embodiment of the optical switch according to the present invention will be explained below with reference to FIGS. 14 and 15A to 15C. The optical switch of this embodiment is also different from the above embodiments in the structure of a position holding mechanism.

Figure 14:
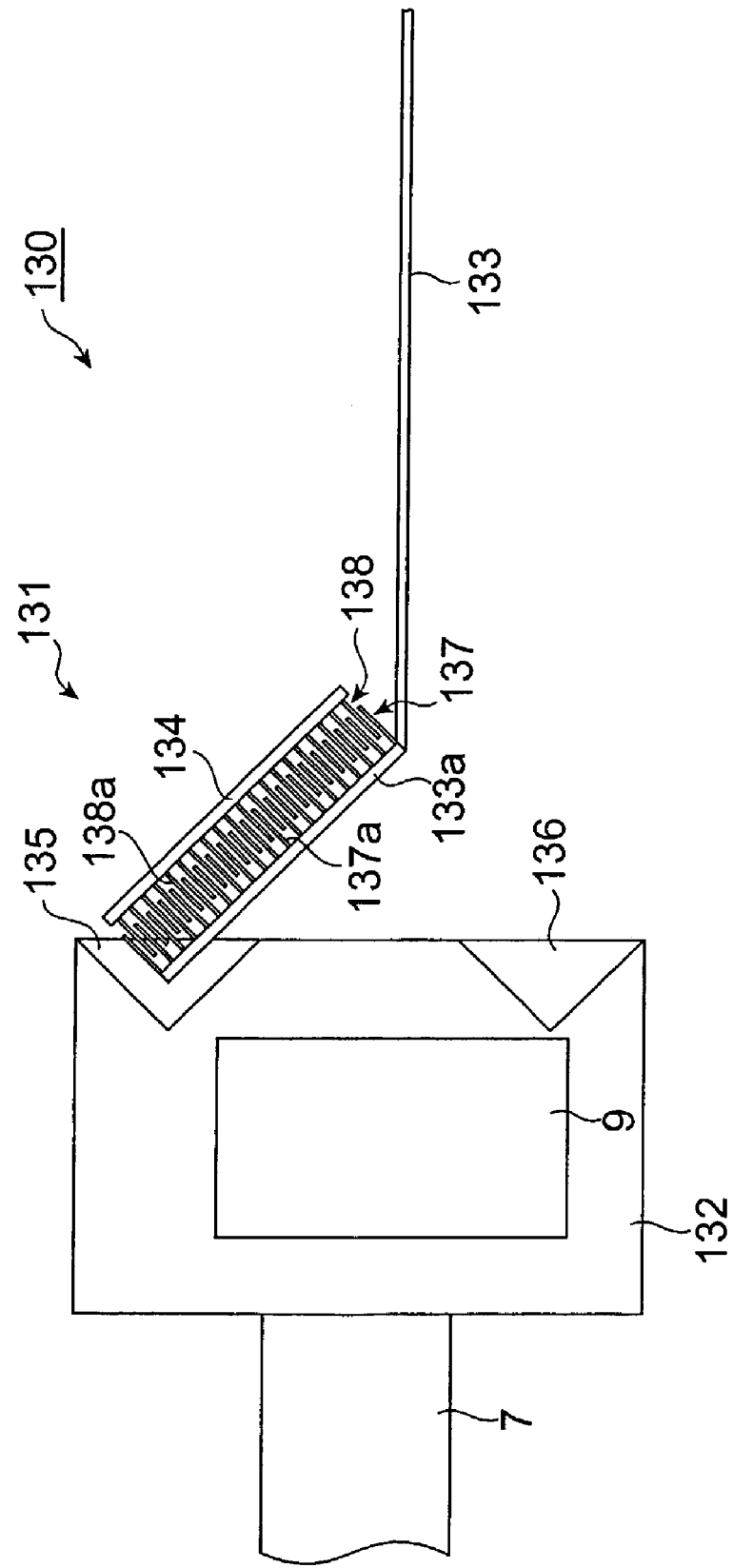
FIG. 14 is a view showing a position holding mechanism in the fourth embodiment of the optical switch according to the present invention.

Referring to FIG. 14, an optical switch 130 of this embodiment has a position holding mechanism 131. This position holding mechanism 131 has a position holding movable portion 133 placed in front of a mirror 9. A bent portion 133a which is bent through an angle of, e.g., 45° is formed in the end portion of this position holding movable portion 133. This bent portion 133a has a comb 137 having a plurality of teeth 137a. A position holding electrode 134 opposes the bent portion 133a. This position holding electrode 134 has a comb 138 having a plurality of teeth 138a. Although not shown, the position holding movable member 133 and position holding electrode 134 are connected via a voltage source.

Also, a holding portion 132 fixing the mirror 9 is formed at the end of a movable member 7. This holding portion 132 has first and second holding notches 135 and 136. The first holding notch 135 locks the bent portion 133a of the position holding movable portion 133 so as to hold the mirror 9 in an intercepting position. The second holding notch 136 locks this bent portion 133a so as to hold the mirror 9 in a through position.

Figure 15:
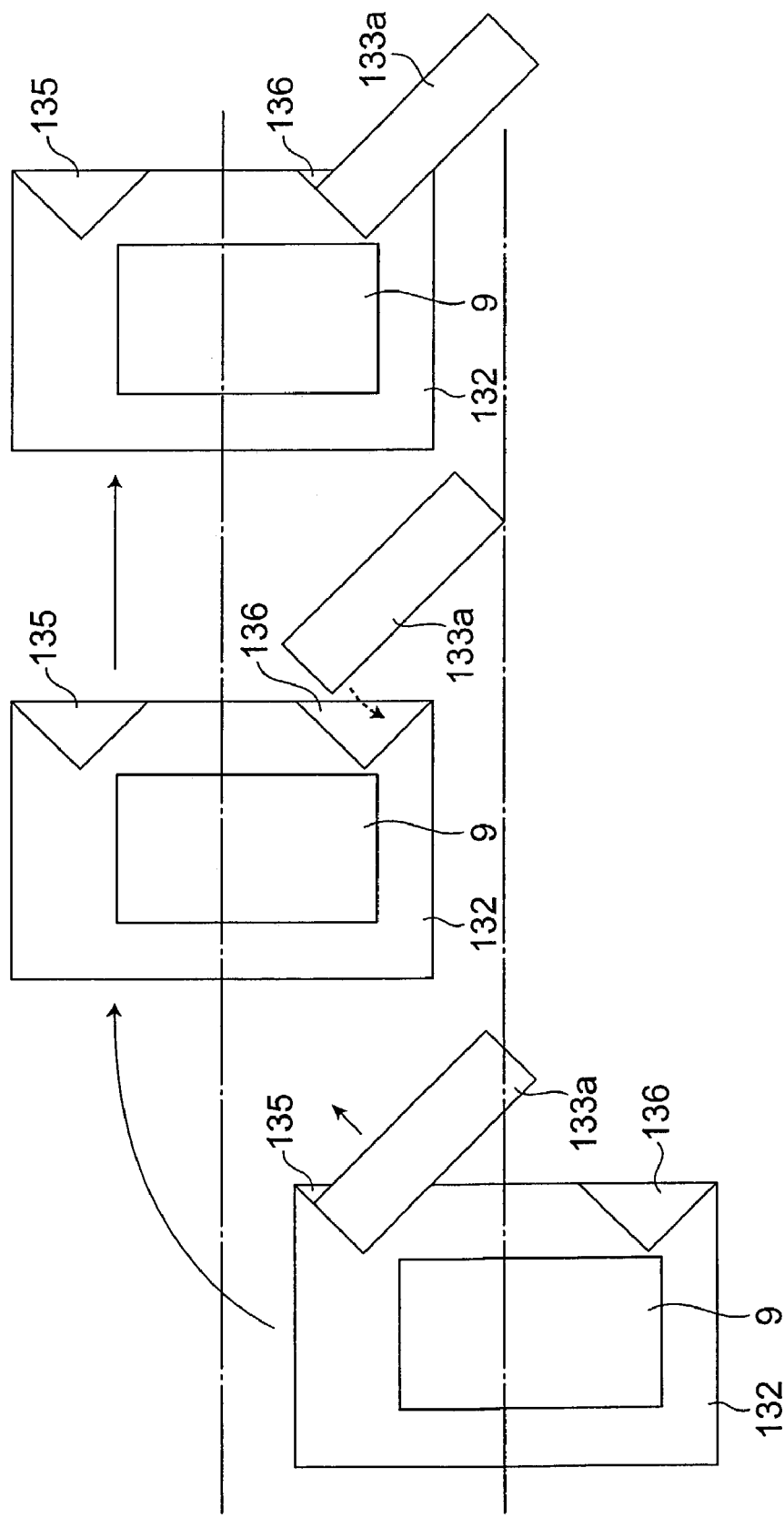
FIGS. 15A to 15C are views showing a mirror position switching operation by the position holding mechanism shown in FIG. 14.

FIGS. 15A to 15C illustrate the procedure of moving the mirror 9 from the intercepting position to the through position in the optical switch 130 as described above. First, by applying a predetermined voltage across the position holding movable portion 133 and position holding electrode 134, as shown in FIG. 15A, the bent portion 133a locked in the first holding notch 135 is moved toward the position holding electrode 134, thereby unlocking this bent portion 133a. By attracting the movable member 7 toward the electrode 10 as described earlier (FIG. 1), the mirror 9 is moved to the through position (FIG. 15B). Subsequently, the application of the voltage supplied across the position holding movable portion 133 and position holding electrode 134 is stopped, thereby moving the bent portion 133a away from the position holding electrode 134 and locking this bent portion 133a in the second holding notch 136 (FIG. 15C).

When the long cantilevered position holding movable portion 133 is formed as described above, the position holding mechanism 131 can be driven at a low voltage while its width is decreased to 500 µm or less.

Other embodiments of the optical switch according to the present invention will be described below with reference to FIGS. 16 to 20, 21A, and 21B. The optical switches of these embodiments are different from the above embodiments in the structure of the movable member or electrode.

Figure 16:
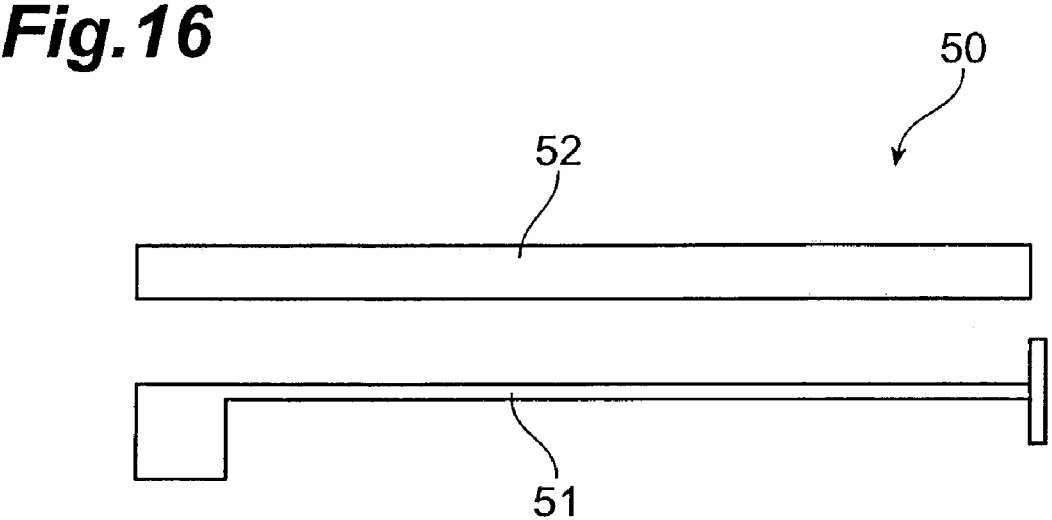

An optical switch 50 shown in FIG. 16 has a movable member 51 and electrode 52. The only difference of the movable member 51 from the movable member 7 described above is that this movable member 51 has no comb. The only difference of the electrode 52 from the electrode 10 described above is also that this electrode 52 has no comb. This electrode 52 extends parallel to the movable member 51 as a whole. In this embodiment, the structures of the movable member 51 and electrode 52 are simplified.

Figure 17:
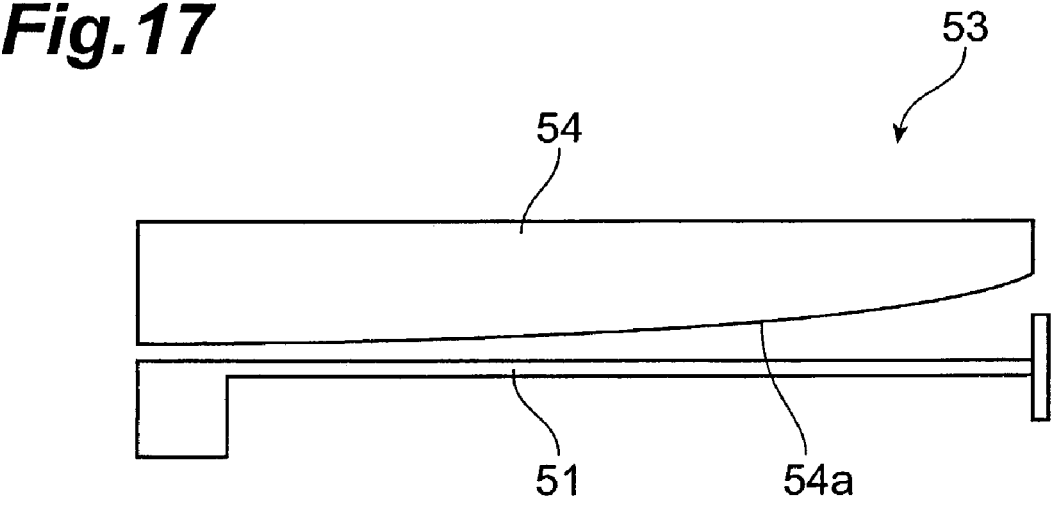

An optical switch 53 shown in FIG. 17 has a movable member 51 and electrode 54. An opposing surface 54a of the electrode 54 which opposes the movable member 51 is curved such that the spacing between this electrode 54 and the movable member 51 decreases from the distal end to the proximal end of the electrode 54. In this structure, the spacing between the movable member 51 and electrode 54 decreases as a whole as the movable member 51 approaches the electrode 54, and this increases the electrostatic force generated between the movable member 51 and electrode 54. Accordingly, as in the previous embodiments, it is possible to lower the driving voltage of the movable member 51 and decrease the length of this movable member 51.

Note that the opposing surface 54a of the electrode 54 which opposes the movable member 51 is not limited to the curved surface. That is, this opposing surface 54a can also be a linear surface as long as the spacing between the movable member 51 and electrode 54 decreases from the distal end to the proximal end of the electrode 54.

Figure 18:
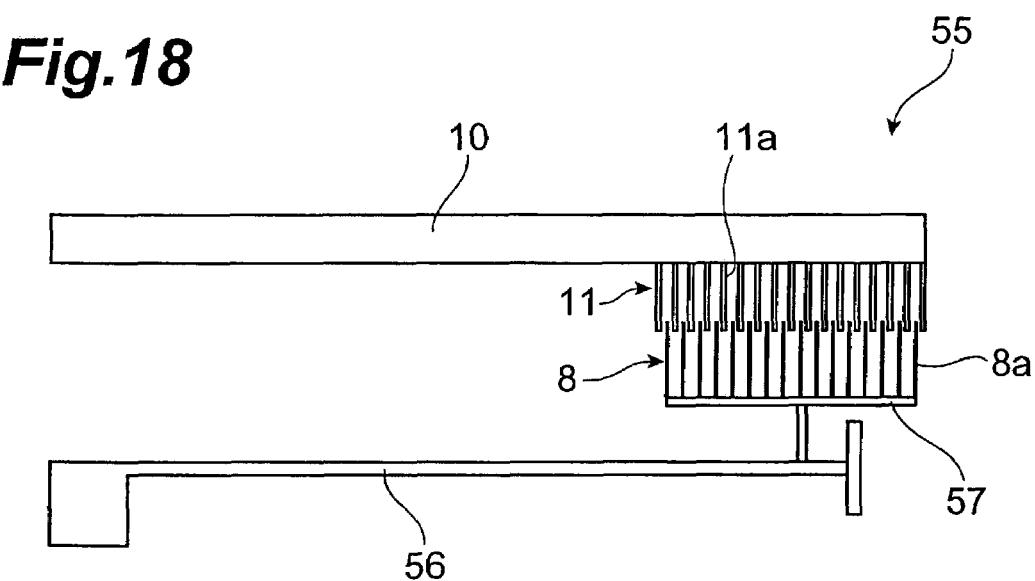

An optical switch 55 shown in FIG. 18 has a movable member 56 and an electrode 10 described previously. A T-shaped comb holder 57 is attached to the end portion of the movable member 56. A comb 8 described earlier is formed on this comb holder 57. In this structure, the electrostatic force generated between the movable member 56 and electrode 10 concentrates to the end portion of the movable member 56. This increases the displacement amount of this end portion of the movable member 56. Accordingly, it is possible to further lower the driving voltage of the movable member 56 and further decrease the length of this movable member 56.

Figure 19:
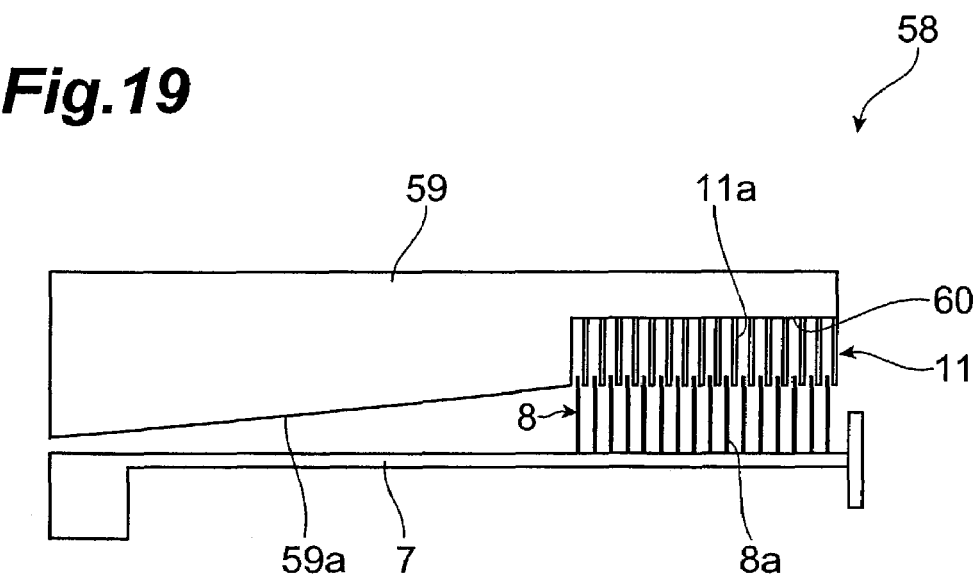

An optical switch 58 shown in FIG. 19 has a movable member 7 described earlier and an electrode 59. A notch 60 is formed in that portion of the electrode 59, which opposes a comb 8 of the movable member 7. A comb 11 described previously is formed in this notch 60. Also, an opposing surface 59a of the electrode 59 which opposes the movable member 7 is a linear surface inclined to the movable member 7, so that the spacing between this movable member 7 and the electrode 59 decreases from the distal end to the proximal end of the electrode 59.

In this structure, the surface area of the electrode 59 is increased by the comb 11. Additionally, the spacing between the movable member 7 and electrode 59 decreases as a whole as the movable member 7 approaches the electrode 59, and this increases the electrostatic force generated between the movable member 7 and electrode 59. Accordingly, it is possible to lower the driving voltage of the movable member 7 and decrease the length of this movable member 7.

Figure 20:
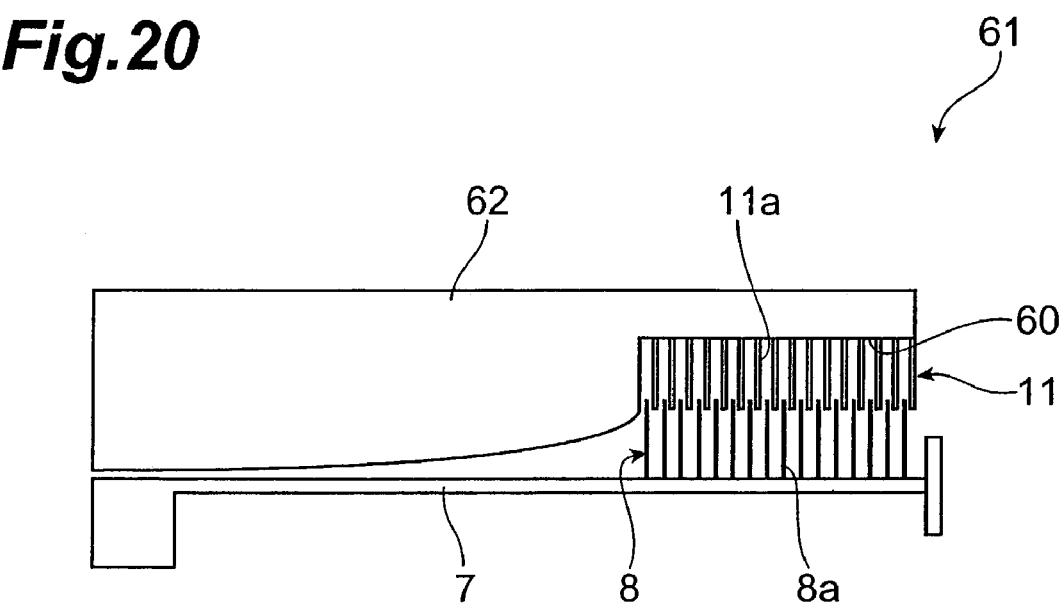

An optical switch 61 shown in FIG. 20 has a movable member 7 described previously and an electrode 62. An opposing surface 62a of the electrode 62 which opposes the movable member 7 is curved such that the spacing between this electrode 62 and the movable member 7 decreases from the distal end to the proximal end of the electrode 62. The rest of the arrangement of this electrode 62 is the same as the electrode 59 shown in FIG. 19. Accordingly, the same effects as the optical switch 58 shown in FIG. 19 can be obtained.

An optical switch 140 shown in FIGS. 21A and 21B has a movable member 141 and electrode 142. A comb 143 having a plurality of teeth 143a is formed in the end portion of the movable member 141. A notch 145 is formed in that portion of the electrode 142, which opposes the comb 143. This notch 145 forms a tapered surface 145a which tapers from the proximal end to the distal end of the electrode 142. A comb 144 having a plurality of teeth 144a is formed in this notch 145. These teeth 144a of the comb 144 become longer from the proximal end to the distal end of the electrode 142. When the movable member 141 is in an initial state as shown in FIG. 21A, therefore, the gap between the distal end of each tooth 143a of the comb 143 and the proximal end (the tapered surface 145a) of each tooth 144a of the comb 144 increases from the proximal end to the distal end of the electrode 142.

When a predetermined voltage is applied between the movable member 141 and electrode 142 in this initial state, as shown in FIG. 21B, the gaps between the distal ends of the teeth 143a of the comb 143 and the proximal ends (the tapered surface 145a) of the teeth 144a of the comb 144 decrease as a whole. Since this increases the electrostatic force acting between the movable member 141 and electrode 142, it is possible to further lower the driving voltage of the movable member 142 and further decrease the length of this movable member 142.

FIG. 22 shows still another embodiment of the optical switch according to the present invention. Referring to FIG. 22, an optical switch 150 of this embodiment includes a movable member 151 having a mirror 158 at its end. A comb 154 having a plurality of teeth 154a is formed on one side of the end portion of this movable member 151. A comb 155 having a plurality of teeth 155a is formed on the side away from the comb 154. A main electrode 152 is positioned on the side of the comb 154 of this movable member 151. In that portion of this main electrode 152, which opposes the comb 154, a comb 156 having a plurality of teeth 156a to be inserted between the teeth 154a of the comb 154 is formed. Also, a returning electrode 153 is positioned on the side of the comb 155 of the movable member 151. In that portion of this returning electrode 153, which opposes the comb 155, a comb 157 having a plurality of teeth 157a to be inserted between the teeth 155a of the comb 155 is formed. The movable member 151 and main electrode 152 are connected via a voltage source 159. The movable member 151 and returning electrode 153 are connected via a voltage source 160.

In this optical switch 150 as described above, when the voltage source 159 applies a predetermined voltage across the movable member 151 and main electrode 152 with the mirror 158 in the initial state as shown in FIG. 22, the movable member 151 is attracted to the main electrode 152 by the electrostatic force generated between these movable member 151 and main electrode 152. When from this state the application of the voltage by the voltage source 159 is stopped and at the same time a predetermined voltage is applied across the movable member 151 and returning electrode 153 by the voltage source 160, the movable member 151 is attracted to the returning electrode 153 by the electrostatic force generated between these movable member 151 and returning electrode 153, thereby returning the mirror 158 to the initial state.

Since this returning electrode 153 is formed, the driving speed of the movable member 151 when the mirror 158 is returned increases compared to the case in which the mirror 158 is returned to its initial position only with the biasing force of the movable member 151.

The optical switch and optical switch array according to the present invention are not restricted to those of the above embodiments. For example, in each of the above embodiments a mirror device including a movable member, electrode, and the like is formed on a planar waveguide. However, this mirror device can also be formed on a base member in which optical fibers are fixed.

Also, in each of the above embodiments, an electrode is formed on a planar waveguide, and a so-called electrostatic actuator which drives a movable member by generating electrostatic force between this movable member and the electrode is used. However, as the means for driving the movable member, an electromagnetic actuator or heat actuator can also be used.

Furthermore, the optical switch of each of the above embodiments is a 2×2 switch or 1×2 switch. However, the present invention is also applicable to an optical switch such as an ON/OFF switch or n×n matrix switch.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical switch comprising:
a base member;
a movable member cantilevered with respect to said base member;
a mirror fixed to the end portion of said movable member to intercept light propagating on an optical path formed in said base member, the mirror extending in a direction substantially perpendicular to an extending direction of said movable member; and
driving means for driving said movable member such that said mirror moves along the upper surface of said base member in the direction substantially perpendicular to the extending direction of said movable member.

2. An optical switch according to claim 1, wherein said driving means comprises a main electrode opposing said movable member, and means for generating electrostatic force between said main electrode and said movable member.

3. An optical switch according to claim 2, wherein a spacing between said main electrode and said movable member decreases from the distal end to the proximal end of said electrode.

4. An optical switch according to claim 2, wherein
said movable member comprises a first comb having a plurality of teeth, and
a second comb having a plurality of teeth to be inserted between the teeth of said first comb is formed in that portion of said electrode, which opposes said first comb.

5. An optical switch according to claim 4, wherein a comb supporting portion is formed at the end portion of said movable member, and said first comb is formed on said comb supporting portion.

6. An optical switch according to claim 4, wherein the lengths of the teeth of said second comb are made different from each other such that a spacing between the distal end of each tooth of said first comb and the proximal end of each tooth of said second comb increases from the proximal end to the distal end of said main electrode.

7. An optical switch according to claim 2, wherein said driving means further comprises a returning electrode placed on the side of said movable member away from said main electrode, and means for generating electrostatic force between said returning electrode and said movable member.

8. An optical switch according to claim 1, further comprising position holding means for holding said mirror in a first position at which said mirror intercepts light propagating on said optical path and a second position at which said mirror passes light propagating on said optical path.

9. An optical switch according to claim 8, wherein said position holding means comprises a position holding movable portion placed in front of said mirror and having a first projection for holding said mirror in the first position and a second projection for holding said mirror in the second position, a position holding driving portion for moving said position holding movable portion in the extending direction of said movable member, and a holding recess which is formed in the end portion of said movable member and into which said first and second projections are inserted.

10. An optical switch according to claim 8, wherein said position holding means is a spring member which is placed in front of said mirror, is in contact with the end portion of said movable member, and has spring force which biases said movable member.

11. An optical switch according to claim 8, wherein said position holding means comprises a position holding movable portion placed in front of said mirror, a position holding electrode opposing said position holding movable portion, a first holding notch formed in the end portion of said movable member to lock said position holding movable portion such that said mirror is held in the first position, and a second holding notch formed in the end portion of said movable member to lock said position holding movable portion such that said mirror is held in the second position.

12. An optical switch according to claim 1, wherein said movable member is designed such that said mirror intercepts light propagating on said optical path in a normal state.

13. An optical switch according to claim 1, wherein said base member is a planar waveguide comprising a core which forms said optical path, and a cladding formed around said core.

14. An optical switch according to claim 13, wherein said planar waveguide has a trench which is formed on said optical path to extend in the direction substantially perpendicular to the extending direction of said movable member, and into which said mirror enters.

15. An optical switch according to claim 13, wherein
said planar waveguide comprises a cladding removed portion formed by removing said cladding except for a portion around said core, and a cut portion which is formed on said optical path to connect to said cladding removed portion, and into which said mirror enters, and
said movable member is formed in said cladding removed portion such that said mirror is positioned in the same plane as said core.

16. An optical switch according to claim 15, wherein said cladding removed portion is formed by removing said cladding by reactive ion etching.

17. An optical switch according to claim 15, wherein said movable member and said mirror are simultaneously formed using the same material.

18. An optical switch according to claim 17, wherein said movable member and said mirror are made of silicon.

19. An optical switch according to claim 13, wherein a mirror device comprising said movable member and said mirror is bonded to said planar waveguide.

20. An optical switch according to claim 19, an aligning projection is formed on one of said planar waveguide and said mirror device, and an aligning recess which fits on said aligning projection is formed in the other of said planar waveguide and said mirror device.

21. An optical switch according to claim 19, wherein said planar waveguide and said mirror device are bonded by anodic bonding.

22. An optical switch according to claim 21, wherein a substrate of said planar waveguide is made of silicon or glass containing alkali metal ion.

23. An optical switch according to claim 1, further comprising a second base member.

24. An optical switch according to claim 23, wherein the movable member is mounted on the second base member.

25. An optical switch array comprising:
a base member; and
a plurality of mirror devices arranged in parallel on said base member,
wherein each said mirror device comprises:
a movable member cantilevered with respect to said base member,
a mirror fixed to the end portion of said movable member to intercept light propagating on an optical path formed in said base member and extending in a direction substantially perpendicular to an extending direction of said movable member, and
driving means for driving said movable member such that said mirror moves along the upper surface of said base member in the direction substantially perpendicular to the extending direction of said movable member.

26. An optical switch array according to claim 25, wherein the array pitch of said mirror devices is not more than 500 μm.

27. An optical switch array according to claim 25, further comprising a second base member.

28. An optical switch array according to claim 27, wherein the movable member is mounted on the second base member.

* * * * *